(12) United States Patent
Deal et al.

(10) Patent No.: US 9,922,222 B2
(45) Date of Patent: *Mar. 20, 2018

(54) BARCODE READER AND ACCESSORY FOR THE BARCODE READER

(71) Applicant: The Code Corporation, Draper, UT (US)

(72) Inventors: John Deal, Springfield, PA (US); Ryan Hoobler, Salt Lake City, UT (US); Garrett Russell, Phoenixville, PA (US)

(73) Assignee: The Code Corporation, Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,635

(22) Filed: Jun. 12, 2017

(65) Prior Publication Data

US 2017/0277923 A1    Sep. 28, 2017

Related U.S. Application Data

(63) Continuation of application No. 14/741,213, filed on Jun. 16, 2015, now Pat. No. 9,679,177, which is a
(Continued)

(51) Int. Cl.
| | |
|---|---|
| *G06F 3/00* | (2006.01) |
| *G06K 7/10* | (2006.01) |
| *G06F 1/26* | (2006.01) |
| *G06F 13/42* | (2006.01) |
| *G06F 13/38* | (2006.01) |

(Continued)

(52) U.S. Cl.
CPC ......... *G06K 7/10821* (2013.01); *G06F 1/266* (2013.01); *G06F 13/4221* (2013.01); *G06K 7/10722* (2013.01); *G06K 7/10851* (2013.01);

*G06F 9/4411* (2013.01); *G06F 13/102* (2013.01); *G06F 13/385* (2013.01)

(58) Field of Classification Search
None
See application file for complete search history.

(56) References Cited

U.S. PATENT DOCUMENTS

| 2003/0222150 A1* | 12/2003 | Sato ............. G06F 1/1626 235/472.02 |
| 2012/0281830 A1* | 11/2012 | Stewart ............. H04L 9/3271 380/255 |
| 2014/0323181 A1* | 10/2014 | Subramaniam ... H04M 1/72527 455/557 |

* cited by examiner

*Primary Examiner* — Henry Tsai
*Assistant Examiner* — Aurangzeb Hassan
(74) *Attorney, Agent, or Firm* — Timothy P. O'Hagan; Ray Quinney & Nebeker

(57) ABSTRACT

A barcode reader and an accessory are disclosed. A barcode reader may include an interface for communication with a host computer via a wireless or wired link and an authentication system to establish mutual authentication with the host computer. The barcode reader may include a connector for connecting the barcode reader to the external power source or the host computer. The connector may be a combined power and data connector. An accessory may provide operating power to a barcode reader and provide decoded data of an image of a barcode received from the barcode reader to a host computer. The accessory may include connectors and an interface system. The interface system may include a processor configured to send the decoded data to the host computer, an authentication system, and a power interface. The accessory may include RF circuits for communicating with the host computer via a wireless link.

20 Claims, 17 Drawing Sheets

Related U.S. Application Data continuation of application No. 14/540,200, filed on Nov. 13, 2014, now abandoned.

(51) Int. Cl.
*G06F 9/44* (2018.01)
*G06F 13/10* (2006.01)

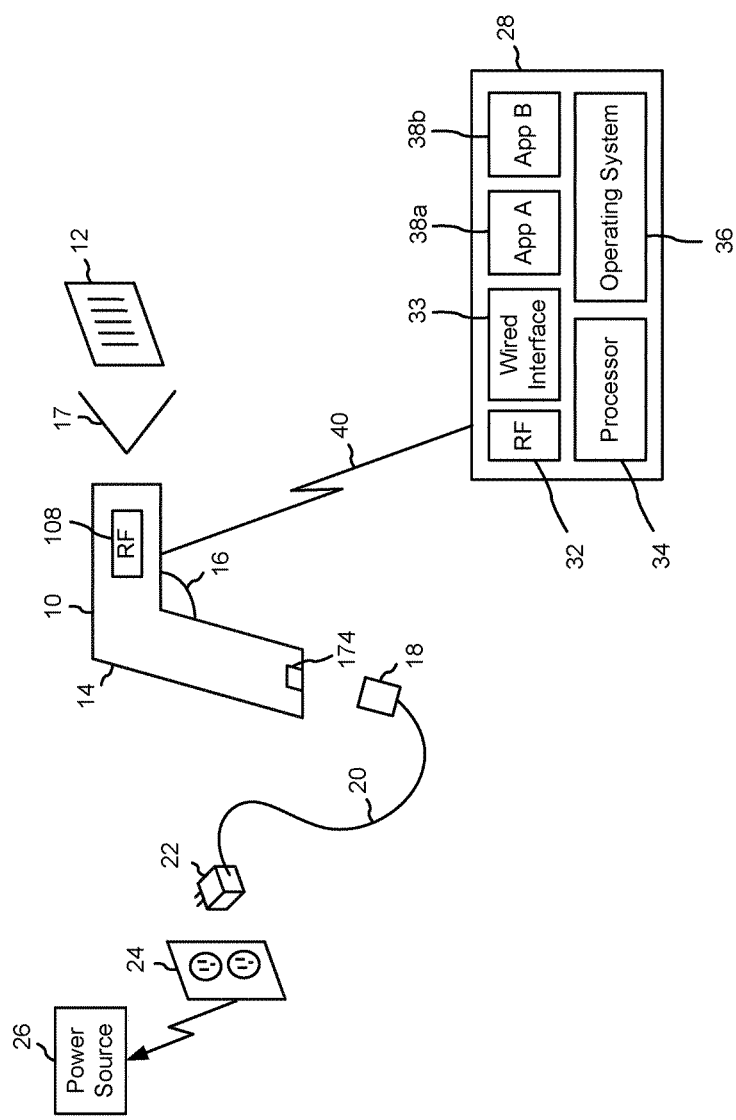

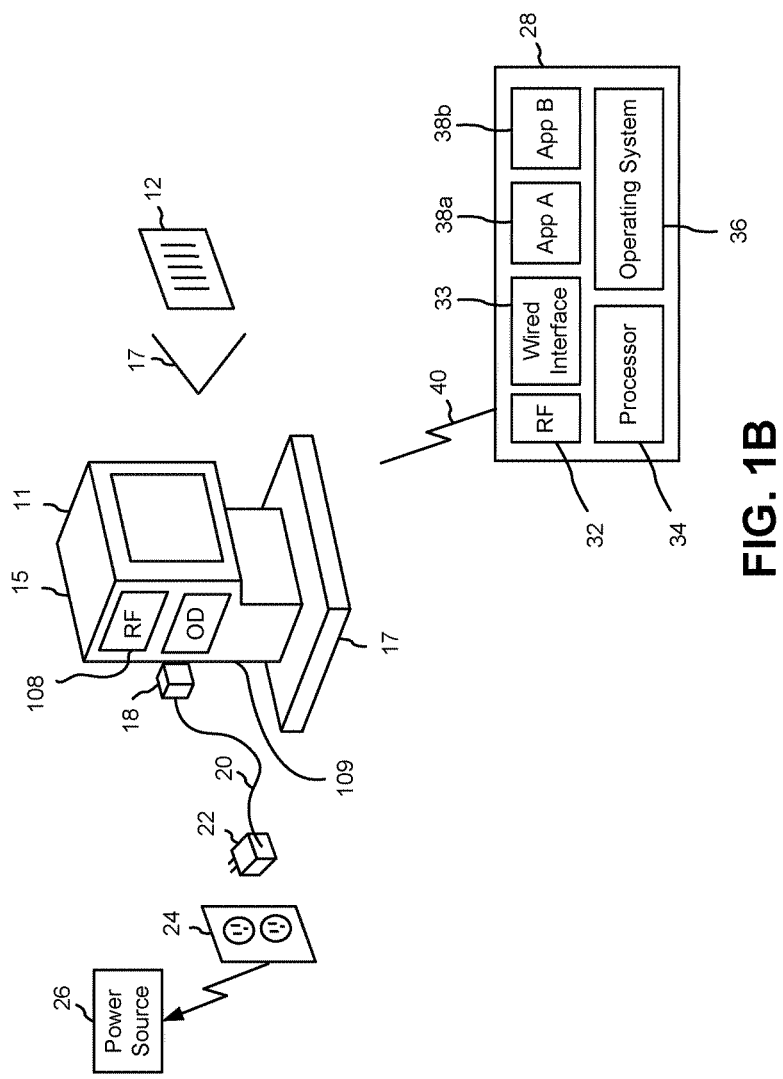

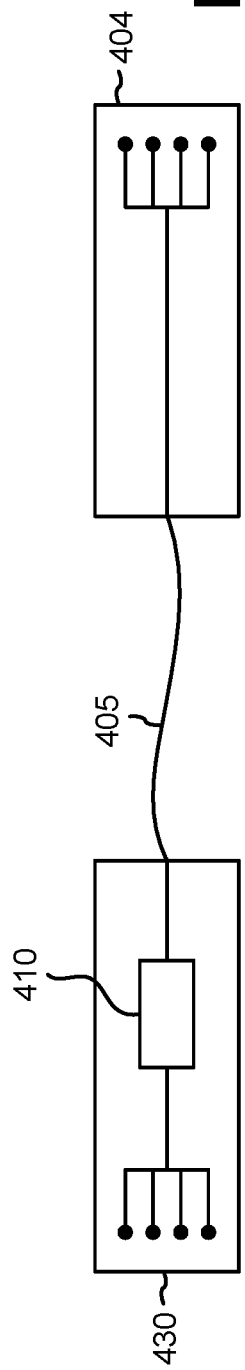
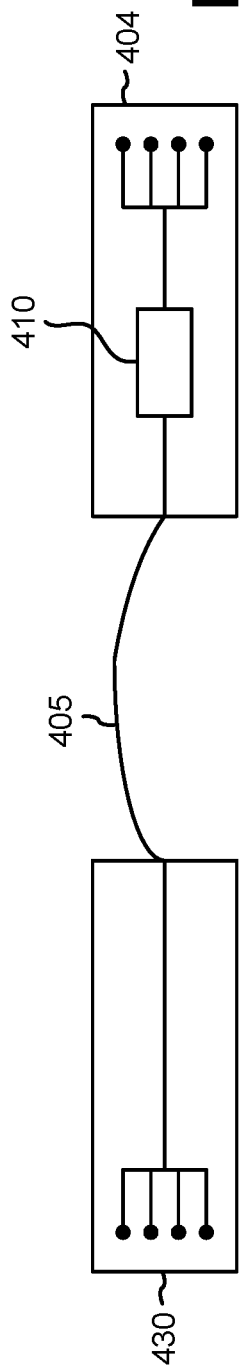
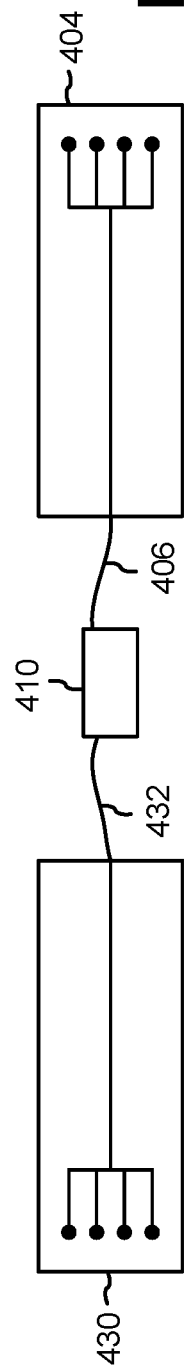
FIG. 6A
FIG. 6B
FIG. 6C

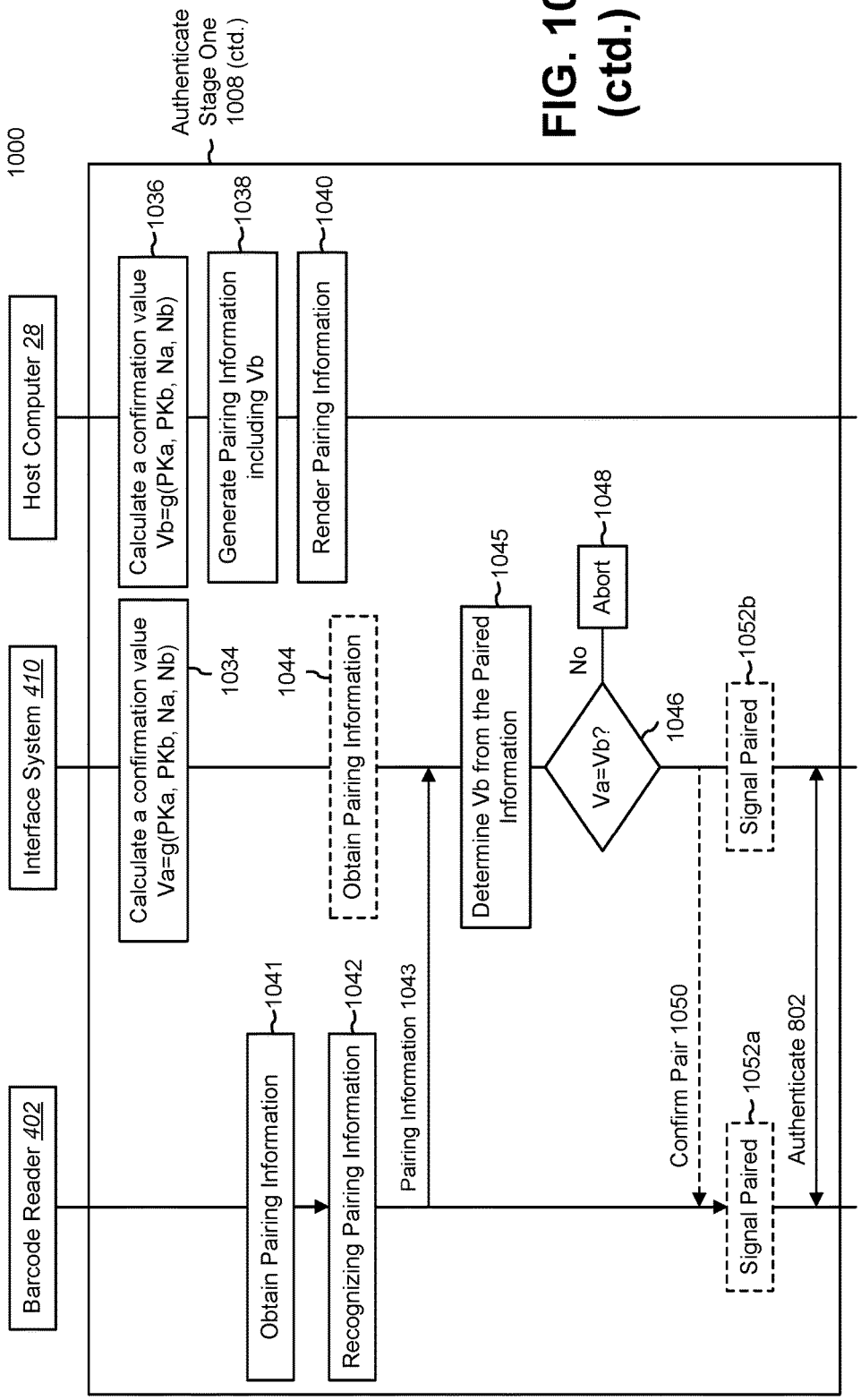
FIG. 10 (ctd.)

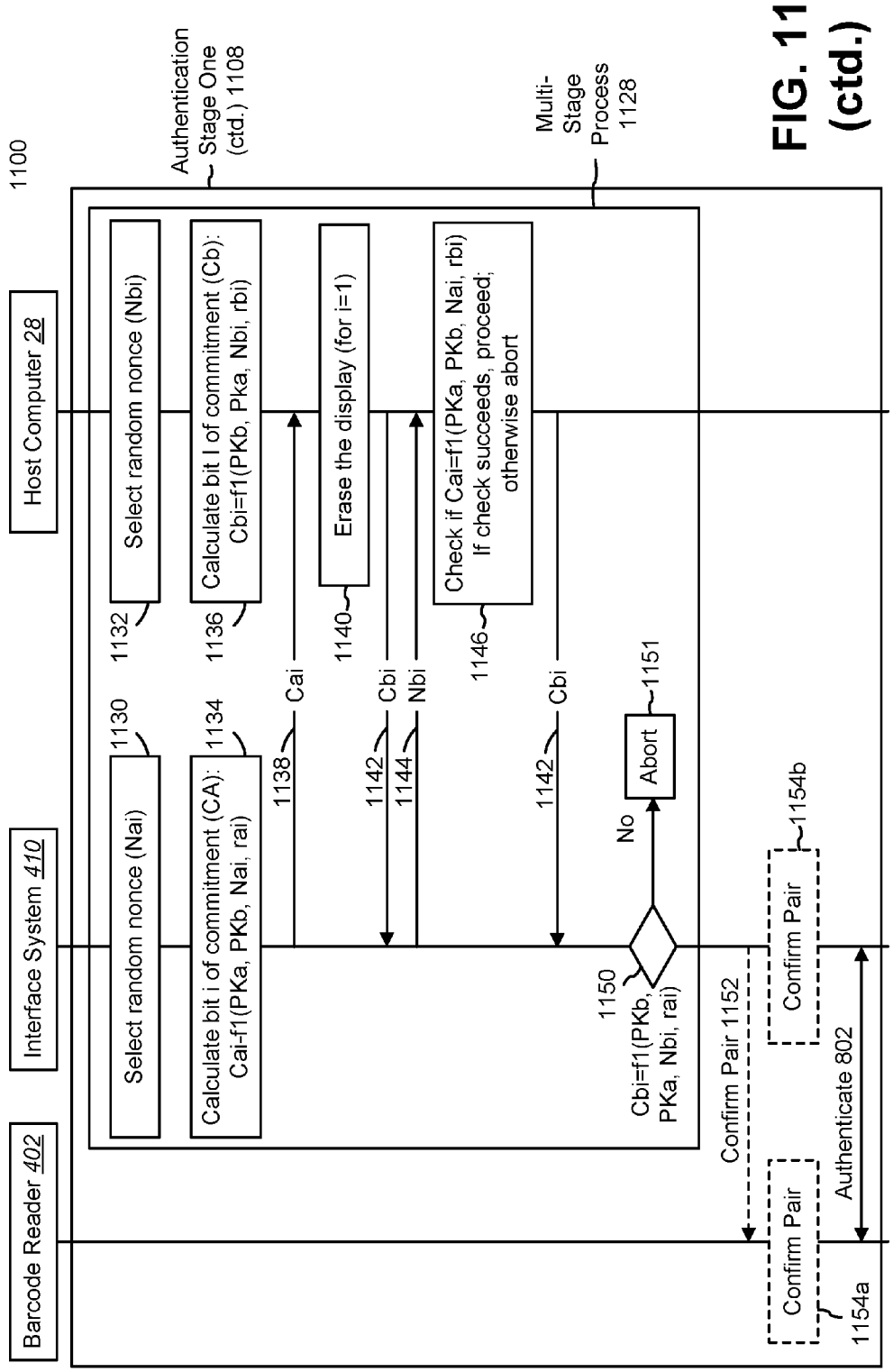
FIG. 11 (ctd.)

BARCODE READER AND ACCESSORY FOR THE BARCODE READER

CLAIM OF PRIORITY

This application is a continuation of U.S. patent application Ser. No. 14/741,213 (the "'213 application"), titled "Barcode Reader and Accessory for the Barcode Reader," filed Jun. 16, 2015, with inventors John Deal, Ryan Hoobler, and Garrett Russell. The '213 application is a continuation of U.S. patent application Ser. No. 14/540,200, titled "BARCODE READER AND ACCESSORY FOR THE BARCODE READER," filed Nov. 13, 2014, with inventors John Deal, Ryan Hoobler, and Garrett Russell.

TECHNICAL FIELD

This application is generally related to a barcode reader and an accessory for the barcode reader.

BACKGROUND

A barcode is an optical machine-readable representation of information. Devices for identifying or extracting information from barcodes are generally referred to as barcode readers (or barcode scanners). An image-based barcode reader includes a camera for capturing an image of a barcode to be read. The camera includes a focusing lens that focuses light reflected from a target area onto a photo sensor array. Once an image of a barcode has been captured by the camera, a decoder processes the image and extracts the information contained in the barcode.

SUMMARY

In accordance with one embodiment, there is provided an externally powered barcode reader. The externally powered barcode reader is operable when coupled to an external power source. The externally powered barcode reader may include a decoder stored in memory and executed by a processor of the barcode reader. The decoder is configured to generate decoded data from an image of a barcode captured by a camera (i.e., an image sensor). The barcode reader may include operating power management circuitry configured to receive operating power from an external power source for operating the barcode reader. The barcode reader may include a wireless interface for communication with a host computer. The barcode reader may include an authentication system (e.g., an authentication co-processor) configured to send an authentication response in response to an authentication challenge from the host computer. The authentication response identifies the externally powered barcode reader as a trusted accessory to the host computer. The externally powered barcode reader may obtain the authentication challenge from the host computer and provide the authentication response to the host computer using the wireless interface.

Alternatively or additionally, the externally powered barcode reader may include an accessory protocol code which, when executed by the processor, enables communication with an operating system of the host computer and provision of data to an application operating on the host computer using an accessory communication protocol.

The accessory communication protocol may require that the decoded data be encapsulated in a communication packet with a header identifying the communication packet as containing data and including a specification identity (ID) value, which uniquely associates with a specification for the data included in the communication packet. The accessory communication protocol may require that information for the operating system of the host computer be encapsulated in a communication packet with a header identifying the communication packet as a control packet.

The wireless interface may be a wireless local area network (WLAN) interface. Alternatively or additionally, the wireless interface may be a wireless point-to-point interface.

Alternatively or additionally, the externally powered barcode reader may include a power/data interface through which the operating power management circuitry receives operating power from the external power source other than the host computer. The operating power management circuitry may receive all or substantially all power required for the present operation of the externally powered barcode reader. All external power received by the operating power management circuitry may be used for operation of the externally powered barcode reader at substantially the same time it is received from the external power source.

The externally powered barcode reader may be a hand-held barcode reader, a presentation scanner, or any other type of device.

In accordance with another embodiment, there is provided a barcode reader. The barcode reader includes an image sensor (e.g., a camera) for capturing an image of a barcode within a field of view of the barcode reader and a connector for receiving operating power from a remote power source via a flexible cable. The barcode reader may include a wireless communication interface for communicating with a remote host over a wireless communication link. The barcode reader may also include a processor configured to obtain a status of a trusted accessory to the remote host by: i) receiving an authentication challenge from the remote host over the wireless communication link; ii) subjecting the authentication challenge to an authentication algorithm to obtain an authentication response; and iii) providing the authentication response to the remote host over the wireless communication link. The processor may be further configured to generate decoded data by decoding the image of the barcode captured by the image sensor, and provide the decoded data via the wireless communication link to the remote host after obtaining the status of a trusted accessory to the remote host. The wireless communication interface may be a wireless point-to-point interface or a WLAN interface.

Alternatively or additionally, the processor may be configured to encapsulate the decoded data in a communication packet with a header identifying the communication packet as containing data and including a specification ID value which uniquely associates with a specification for the data included in the communication packet. The processor may be further configured to encapsulate information for an operating system of the remote host in a communication packet with a header identifying the communication packet as a control packet. The processor may be further configured to receive from the remote host a control packet including configuration commands for the barcode reader.

In accordance with another embodiment, there is provided an externally powered barcode reader. The barcode reader is coupled to a remote power source via a flexible cable and draws substantially all power consumed by operation of the barcode reader from the remote power source contemporaneously with its consumption. The externally powered barcode reader includes an image sensor for capturing an image of a barcode within a field of view of the barcode reader. The barcode reader may include a wireless interface for communication with a remote host over a wireless link. The barcode reader may include a code, stored in memory and executed by a processor, for authenticating the barcode reader as a trusted accessory to the remote host, generating decoded data from the image of the barcode captured by the image sensor, and providing the decoded data to the remote host utilizing a communication protocol over the wireless link after the barcode reader has been authenticated as a trusted accessory to the remote host.

Alternatively or additionally, the barcode reader may include a code, stored in the memory and executed by the processor, for enabling communication with an operating system of the remote host and provision of data to an application operating on the remote host using an accessory communication protocol. The accessory communication protocol may require that the decoded data be encapsulated in a communication packet with a header identifying a specification to which the decoded data in the communication packet conforms. The accessory communication protocol may require that information for the operating system of the remote host be encapsulated in a communication packet with a header identifying the communication packet as a control packet.

In accordance with another embodiment, there is provided an accessory for a barcode reader. The accessory provides operating power to the barcode reader and provides decoded data of an image of a barcode received from the barcode reader to a host computer. The accessory includes a first power/data connector for connecting to a barcode reader, and a second power/data connector for connecting to a host computer or a power source. The accessory includes a first power/data interface coupled to the first power/data connector, wherein decoded data of an image of a barcode is received from the barcode reader via the first power/data interface. The accessory includes a second power/data interface coupled to the second power/data connector, wherein the second power/data interface is configured to provide a communication link to the host computer.

The accessory includes a relay communication system configured to obtain a status of a trusted accessory to the host computer by: i) receiving an authentication challenge from the host computer over the communication link; ii) subjecting the authentication challenge to an authentication algorithm to obtain an authentication response; and iii) providing the authentication response to the host computer over the communication link. The relay communication system is also configured to relay decoded data of an image of a barcode received from the barcode reader to the host computer after obtaining status as a trust accessory to the host computer. The relay communication system may be configured to relay the decoded data to the host computer using iPod® Accessory Protocol iAP or iAP2.

The accessory may include power interface circuits coupled to the first power/data interface and the second power/data interface, and configured to draw operating power for the barcode reader from a power source and provide the operating power for the barcode reader to the barcode reader. The power interface circuits may draw operating power for the relay communication system from the power source and provide the operating power for the relay communication system to the relay communication system.

The first power/data connector and the second power/data connector may be a Universal Serial Bus (USB) male connector. The operating power provided to the barcode reader may comply with USB specification.

Alternatively or additionally, the accessory may include radio frequency (RF) circuits for communicating with the host computer via a wireless link.

Alternatively or additionally, the power interface circuits may draw the operating power for the barcode reader and/or the relay communication system from the host computer. The host computer may be a mobile device. Alternatively or additionally, the power interface circuits may draw the operating power for the barcode reader and/or the relay communication system from a wall outlet via a transformer. The transformer may be included in the second power/data connector.

In accordance with another embodiment, there is provided an accessory for a barcode reader for providing operating power to the barcode reader and providing decoded data of an image of a barcode received from the barcode reader to a host computer. The accessory includes a power/data connector for connecting to the barcode reader, and a power/data interface coupled to the power/data connector, wherein decoded data of an image of a barcode is received from the barcode reader via the power/data interface. The accessory also includes a power interface coupled to a power source and configured to draw operating power for the barcode reader from the power source and provide the operating power to the barcode reader through the power/data connector. The accessory may include a host interface coupled to the power/data interface and configured to authenticate the accessory as a trusted device to the host computer, and provide decoded data received from the barcode reader to the host computer utilizing a communication protocol after the accessory has been authenticated as a trusted device to the host computer.

Alternatively or additionally, the power interface may be configured to draw the operating power for the barcode reader from the power source via a second power/data interface, and provide the operating power to the barcode reader via the first power/data interface and the power/data connector. The power source may be the host computer. The host computer may be a mobile device. The power interface may draw the operating power from a wall outlet via a transformer that may be included in the second power/data connector. The power/data connector may be a USB male connector. The operating power provided to the barcode reader may comply with USB specification.

Alternatively or additionally, the host interface may include a relay code that, when executed by a processor of the accessory, sends the decoded data received from the barcode reader to the host computer, and a protocol system comprising accessory protocol circuits and accessory protocol code. The protocol system may implement a communication protocol specific to the host computer when communicating with the host computer, wherein the accessory protocol code is stored in memory of the accessory and executed by the accessory protocol circuits. The communication protocol may be iPod® Accessory Protocol iAP or iAP2.

Alternatively or additionally, the accessory may include RF circuits for communicating with the host computer via a wireless link.

In accordance with another embodiment, there is provided an accessory for a barcode reader. The accessory includes a cable with a connector for connecting to the barcode reader, a first power/data interface configured to provide operating power to the barcode reader via the cable and the connector, a second power/data interface configured to receive the operating power from a power source, and a code executable by a processor of the accessory. The code is configured to authenticate the accessory as a trusted accessory to a mobile device (e.g., a host computer/device), and send decoded data of an image of a barcode received from the barcode reader to the mobile device using a protocol after the accessory has been authenticated to the mobile device.

Alternatively or additionally, the accessory may include RF circuits for communicating with the mobile device via a wireless link. The RF circuits may be either a wireless point-to-point interface or a WLAN interface.

Alternatively or additionally, the mobile device may act as a master device to the accessory.

Alternatively or additionally, the power source may be the mobile device. Alternatively or additionally, the second power/data interface may receive the operating power from a wall outlet via a transformer.

In accordance with another embodiment, there is provided an accessory for a barcode reader for providing operating power to the barcode reader and providing decoded data of an image of a barcode received from the barcode reader to a host computer. The accessory includes a power/data connector for connecting to the barcode reader, and a power/data interface coupled to the power/data connector that receives decoded data of an image of a barcode from the barcode reader. The accessory also includes a power interface coupled to a power source for drawing operating power for the barcode reader from the power source and providing the operating power to the barcode reader through the power/data connector. The accessory may also include a host interface circuit coupled to the power/data interface, and may be configured to authenticate the accessory as a trusted device to the host computer, and provide the decoded data received from the barcode reader to the host computer utilizing a communication protocol after the accessory has been authenticated as a trusted device to the host computer.

Alternatively or additionally, the accessory may include memory that includes at least one of a point-to-point interface driver, an RF circuit driver, an accessory protocol code, or a relay code.

Alternatively or additionally, the operating power provided to the barcode reader complies with the USB specification. Alternatively or additionally, the power interface may be configured to provide operating power to the accessory.

In accordance with another embodiment, there is provided a barcode reader system. The barcode reader system includes a barcode reader for generating decoded data of an image of a barcode and an accessory. The accessory includes a connector, a power/data interface configured to couple to the barcode reader via the connector and provide operating power to the barcode reader, a processor, and a code. The code is executed by the processor for authenticating the accessory as a trusted accessory to a mobile device, receiving the decoded data from the barcode reader via the power/data interface, and sending the decoded data to the mobile device using a communication protocol after the accessory has been authenticated to the mobile device.

Alternatively or additionally, the connector may be a USB male connector. Alternatively or additionally, the communication protocol may be iPod® Accessory Protocol iAP or iAP2.

In accordance with another embodiment, there is provided a barcode reader system including a barcode reader and an accessory for the barcode reader. The barcode reader includes an image decoder configured to produce decoded image data, and a power conversion circuitry configured to convert received operating power into multiple operating power levels. The accessory includes a cable with a connector for connecting to the barcode reader, a first power/data interface configured to operate as a master device to the barcode reader and provide the operating power to the barcode reader via the cable and the connector, and a second power/data interface configured to receive the operating power from a power source. The accessory may include an RF circuitry configured to wirelessly transmit the decoded image data to a mobile device. The accessory may include a protocol system configured to implement a communication protocol specific to the mobile device. The protocol system includes accessory protocol circuits and accessory protocol code. The protocol system is configured to determine, based on a header of each received packet from the mobile device, whether each received packet is a control packet for use in the protocol system or a data packet for use in the barcode reader. The control packet may include configuration commands for the barcode reader.

Alternatively or additionally, the second power/data interface may be configured to receive the operating power from the mobile device. Alternatively or additionally, the second power/data interface may be configured to receive the operating power from a wall outlet via a transformer. Alternatively or additionally, the operating power provided to the barcode reader complies with the USB specification.

In accordance with another embodiment, there is provided a barcode reading system for providing decoded data of an image of a barcode to a host computer. The barcode reading system includes a barcode reader comprising a decoding code stored in memory of the barcode reader and executed by a barcode reader processor to generate decoded data from a barcode, a power/data cable, coupled to the barcode reader, for providing operating power to the barcode reader, and an accessory circuit for communicating with the barcode reader though the power/data cable and establishing a communication link with the host computer. The accessory circuit may be configured to: i) authenticate the accessory circuit as a trusted accessory to the host computer, and ii) provide the decoded data received from the barcode reader to the host computer using a communication protocol after the accessory circuit has been authenticated to the host computer.

Alternatively or additionally, the accessory circuit may include memory that includes at least one of a point-to-point interface driver, an RF circuit driver, an accessory protocol code, or a relay code.

Alternatively or additionally, the operating power provided to the barcode reader complies with the USB specification. Alternatively or additionally, the power/data cable may be configured to provide operating power to the accessory circuit.

Alternatively or additionally, the accessory circuit may include accessory protocol code, which enables communication with an operating system of the host computer and provision of data to an application operating on the host computer using an accessory communication protocol. Alternatively or additionally, the accessory communication protocol may require that the decoded data be encapsulated in a communication packet with a header identifying the communication packet as containing data and including a specification ID value which uniquely associates with a specification for the data included in the communication packet. The accessory communication protocol may further require that information for the operating system of the host computer be encapsulated in a communication packet with a header identifying the communication packet as a control packet.

A number of features are described herein with respect to embodiments of the invention. It will be appreciated that features described with respect to a given embodiment also may be employed in connection with other embodiments.

BRIEF DESCRIPTION OF THE DRAWINGS

FIG. 1A depicts an example system including an externally powered barcode reader, embodied as a hand-held barcode reader, and a host computer that are communicating over a wireless connection in accordance with one embodiment.

FIG. 1B depicts an example system including an externally powered barcode reader, embodied as a presentation barcode reader, and a host computer that are communicating over a wireless connection in accordance with one embodiment.

FIGS. 6A-6C show different embodiments of the interface system.

DETAILED DESCRIPTION

Figure 1C:
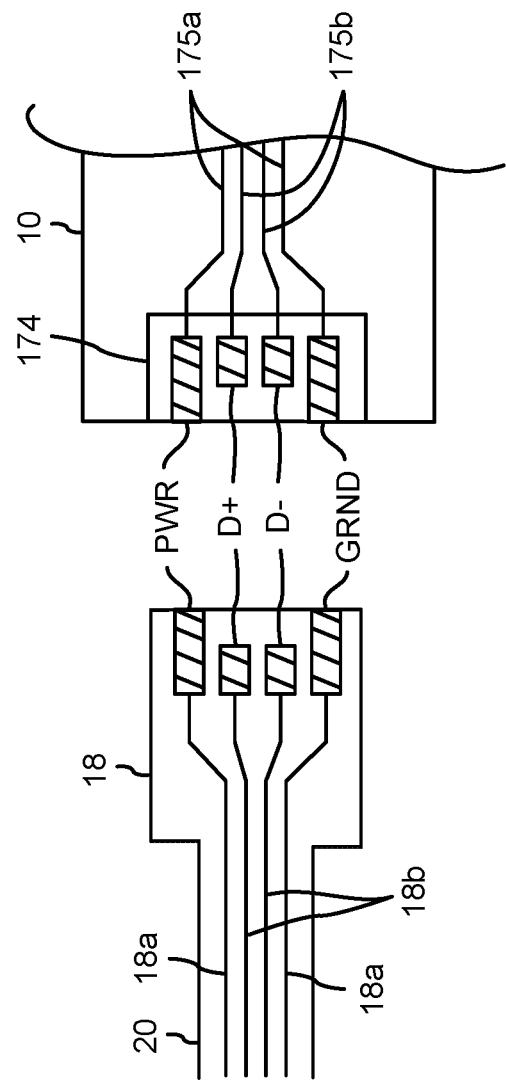
FIG. 1C shows a diagram of an example power/data connector of an externally powered barcode reader and a mating connector of a power cable in accordance with one embodiment.

The present disclosure provides a barcode reader that is either externally powered from an external power source or powered by an external battery pack detachable from the barcode reader, and an accessory connectable to the barcode reader for power and/or data connection.

FIG. 1A depicts an example system including an externally powered barcode reader 10 and a host computer 28 that are communicating over a wireless communication link 40 in accordance with one embodiment. The externally powered barcode reader 10 may have a variety of configurations. For example, the externally powered barcode reader 10 may be a hand-held image capture type of barcode reader. The externally powered barcode reader 10 may include a handheld housing 14 and a trigger switch 16. The externally powered barcode reader 10 may have a field of view 17 extending towards the front of the externally powered barcode reader 10. Upon actuation of the trigger switch 16 by a user, the externally powered barcode reader 10 captures an image of a barcode 12 within the field of view 17.

The barcode reader 10 includes a power/data interface 174 to obtain operating power from an external power source 26. In one embodiment, the power/data interface 174 is coupled to a mating connector 18 of a power cable 20. The power cable 20 may include or be coupled to a transformer 22 which converts ordinary AC power of 100 V to 240 V as provided by a power source 26 and available at a typical wall outlet 24 to DC power of a specific voltage (e.g., 5 V) for powering the barcode reader 10.

FIG. 1C shows a diagram of one example of the power/data interface 174 of the externally powered barcode reader 10 and a mating connector 18 of the power cable 20 in accordance with one embodiment. The power/data interface 174 of the barcode reader 10 and the mating connector 18 of the power cable 20 may include two conductors for power. The power/data interface 174 and the mating connector 18 may include additional conductors for data connection. The power/data interface 174 and the mating connector 18 may be a 4-conductor connector (such as a USB connector) which includes two conductors for power (PWR and GRND) and two conductors for data (D+ and D−).

The contacts for the power conductors 175a, 18a may extend farther from the base of the power/data interface 174 and the mating connector 18 such that the contacts for the power conductors 175a, 18a are engaged prior to the contacts for the data conductors 175b, 18b when the power/data interface 174 is coupled to the mating connector 18.

FIG. 1B depicts an example system including an externally powered barcode reader 11, embodied as a presentation barcode reader, and a host computer 28 that are communicating over a wireless communication link 40 in accordance with one embodiment. The externally powered barcode reader 11 may comprise a housing 15 which includes a stand or base configured for supporting the barcode reader 11 on a flat surface such that a field of view 17 extends towards the front of the externally powered barcode reader 11. The externally powered barcode reader 11 may read barcodes 12 which are presented to the barcode reader 11 by placement within the field of view 17.

In one embodiment, the barcode reading systems (e.g. the image sensor, processor, illumination, or system package) may remain operational substantially the entire time the barcode reader 11 is coupled to a power source and powered "on" such that it may read a barcode 12 when the barcode 12 is presented to the barcode reader 11 by placement within the field of view 17.

In another embodiment, the barcode reader 11 may include an object detection system 109 which may remain operational substantially the entire time the barcode reader 11 is coupled to a power source and powered "on" such that when an object, or more specifically an object with contrast (black/white) consistent with that of a barcode 12 is within the field of view 17, the barcode reading systems may be activated to read the barcode 12. The object detection system 109 may itself have a field of view (not shown) that is within the central portion of the field of view 17.

The barcode reader 11 includes a power/data connector (not shown) to obtain operating power from an external power source 26. In one embodiment, the power/data connector is coupled to a mating connector 18 of a power cable 20. Each of these components may be as described with respect to FIG. 1A.

The host computer 28 (depicted in FIGS. 1A and 1B) includes a processor 34, a wireless interface 32 (which is labeled "RF" in FIGS. 1A and 1B), a wired interface 33, an operating system 36, and applications 38*a*, 38*b*. The applications 38*a*, 38*b* running on the processor 34 may receive the decoded data of an image of a barcode from the barcode reader 10 and 11 via the wireless interface 32 or the wired interface 33. The applications 38*a*, 38*b* running on the host computer 28 may send configuration commands to the barcode reader 10, 11 via the wireless interface 32 or the wired interface 33. The host computer 28 may be a mobile device.

The externally powered barcode reader 10, 11 may be operable when coupled to an external power source. The externally powered barcode reader 10, 11 is distinguishable from a battery powered barcode reader such that the battery powered barcode reader may operate by battery power without coupling to an external or detachable power source. An externally powered barcode reader 10, 11 may also be referred to as a non-battery powered barcode reader because it does not have a battery for operation while not being coupled to an external power source. The term "operation" means power up, including boot up, and typical operation of a barcode reader in its ordinary use.

The externally powered barcode reader 10, 11 may include a task completion and shutdown power source (i.e., an internal power source, for example, a large capacitor (e.g., a Super Cap), a small battery, or other internal power source of minimal capacity) for task completion and shut down. The externally powered barcode reader 10, 11 may complete a pending operation and perform an orderly shutdown of electronic components within the barcode reader 10, 11 or perform an operation for a limited period of time with the power provided by the task completion and the shutdown of the power source, for example, upon failure of, or disconnection from, the external power source. The capacity of the task completion and shutdown power source is significant enough for completion of a pending sequence of tasks such as completing reading and decoding a code and transmitting decoded data for an in-process barcode read or a sequence of barcode reads. An externally powered barcode reader 10, 11 with such a task completion and shutdown power source is distinguishable from a battery powered barcode reader, which typically has capabilities of powering up using battery power and operating for an extended period of time (e.g., more than one hour) on battery power.

Referring again to FIGS. 1A and 1B, the barcode reader 10, 11 may include a wireless interface 108 (which is labeled "RF" in FIGS. 1A and 1B) to communicate with a wireless interface 32 of a host computer 28 over a wireless communication link 40. The wireless communication link 40 may be established using a point-to-point wireless protocol such as Bluetooth®, IEEE 802.11, or any other wireless communication protocol including, but not limited to, Wideband Code Division Multiple Access (WCDMA), High Speed Packet Access (HSPA), cdma2000, Long Term Evolution (LTE), IEEE 802.16, or the like. When the wireless communication link 40 is established data may be communicated between the barcode reader 10, 11 and the host computer 28 via the wireless communication link 40.

Both the barcode reader 10, 11 and the host computer 28 may operate the wireless communication protocols (e.g., Bluetooth®, IEEE 802.11, or any other wireless communication protocols) to: i) establish a communication link between the wireless interface 108 of the barcode reader 10, 11 and the corresponding wireless interface 32 of the host computer 28, and ii) enable application level communication between the barcode reader 10, 11 and the host computer 28. In one embodiment, the application level communication may be, for example, by way of USB framing or emulation.

Alternatively or additionally, the barcode reader 10, 11 and the host computer 28 may implement a proprietary protocol for communication. For example, the barcode reader 10, 11 and the host computer 28 may operate communication protocols such as the iPod® Accessory Protocol (iAP or iAP2) over USB or other wired or wireless serial or point-to-point interfaces.

Figure 2:
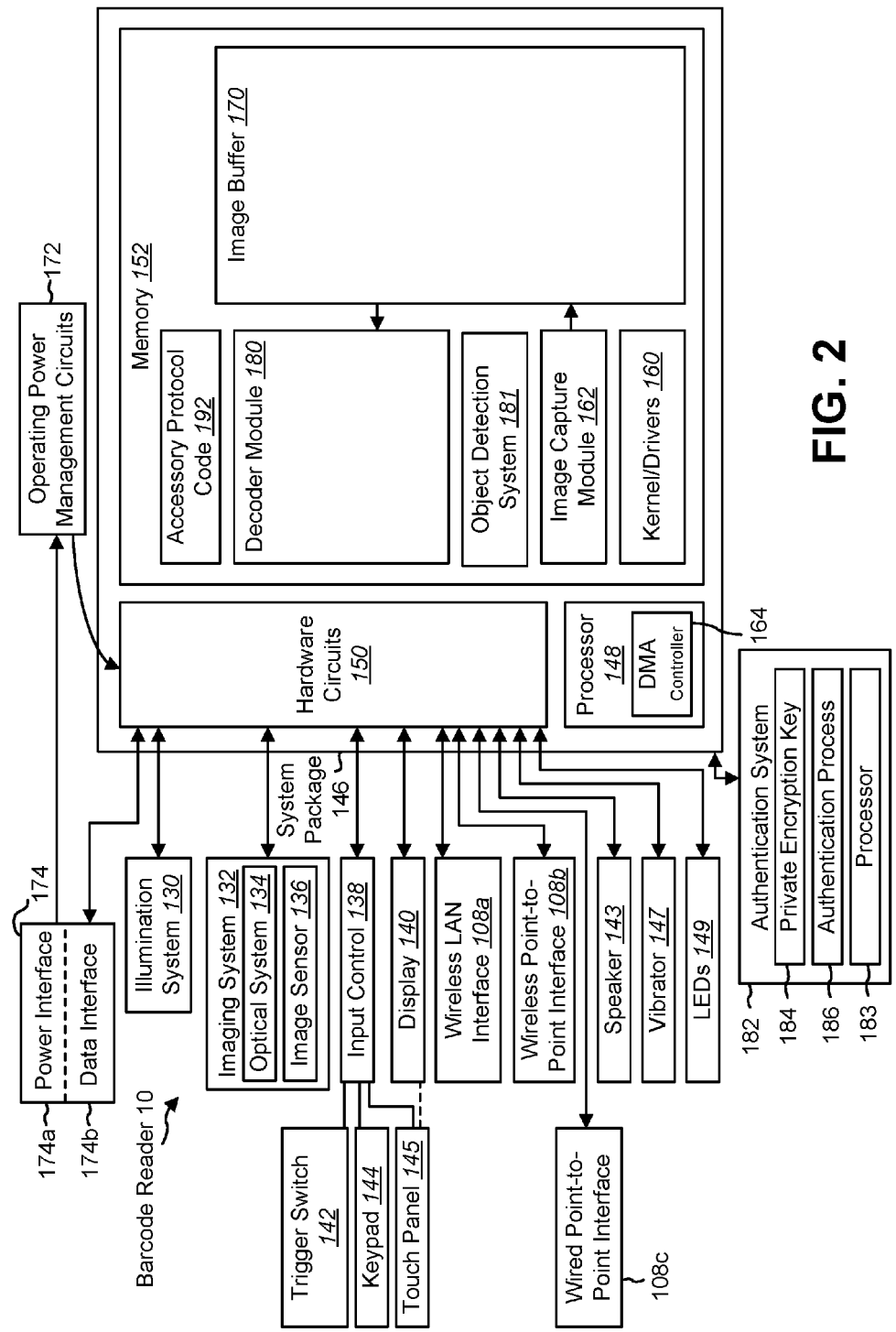
FIG. 2 depicts detailed components of the externally powered barcode reader in accordance with one embodiment.

FIG. 2 depicts detailed components of the externally powered barcode reader 10, 11 in accordance with one embodiment. The barcode reader 10, 11 may include an illumination system 130 and an imaging system 132. The illumination system 130 may be configured to illuminate a target area, which may include a barcode, while the imaging system 132 captures one or more images of the barcode. The illumination system 130 may include targeting illumination and one or more sets of exposure illuminators. The illumination system 130 may include multiple illumination systems as described in U.S. patent application Ser. No. 14/105, 380 entitled "Barcode Reader Having Multiple Illumination Systems and Multiple Sets of Imaging Optics" filed on Dec. 13, 2013, the contents of which are hereby incorporated by reference. The imaging system 132 may include one or more optical systems 134 and one or more two-dimensional image sensors 136 (e.g., a camera). Each image sensor 136 may comprise a two-dimensional array of pixels and a detector capable of measuring or quantifying light incident on the pixel array. The image sensor 136 may be a charge coupled device (CCD) sensor, complementary metal oxide semiconductor (CMOS) sensor, etc. Each optical system 134 may comprise a single lens or series of lenses capable of focusing light onto the image sensor 136.

The barcode reader 10 may further include a user interface comprising input control 138 and/or a display 140. The input control 138 may include a trigger switch 142, a keypad 144, and/or a touch panel 145, such as a touch screen, over the display 140. In addition, the barcode reader 10 may have one or more output devices that convey information to a user. Such output devices may include the touch panel 145, which may be a touch screen, a speaker 143, a vibrator 147, and/or one or more components that illuminate in a manner visible to a user, such as one or more light emitting diodes (LEDs) 149.

The barcode reader 10, 11 may include one or more communication interfaces 108. More specifically, the barcode reader 10, 11 may include a wireless LAN interface 108*a*, a wireless point-to-point interface 108*b*, and/or a wired point-to-point interface 108*c*.

The wireless LAN interface 108*a* may permit the barcode reader 10, 11 to be an addressable endpoint of a wireless local area network and to communicate with a host computer 28 though a wireless LAN using, for example, Transmission Control Protocol/Internet Protocol (TCP/IP) or the like over a Wi-Fi (IEEE 802.11) and/or an Ethernet network or the like.

The wireless point-to-point interface(s) 108*b* may be a Bluetooth® interface protocol (IEEE 802.15), Wi-Fi Direct, or a similar point-to-point protocol to enable the barcode reader 10, 11 to establish a wireless point-to-point connection link with, and communicate over the link with, a host computer 28.

The wired point-to-point interface(s) 108*c* may comprise a Universal Serial Bus (USB), a Universal Asynchronous Receiver/Transmitter (UART), or other point-to-point communication interface to enable the barcode reader 10, 11 to establish a point-to-point connection with a host computer 28 using the cable 20 with multiple data conductors.

Each of the foregoing may be coupled to a system package 146. The system package 146 may comprise a single package or multiple packages. The system package 146 may include one or more silicon dies that include a processor 148, hardware circuits 150 for operating the components discussed above, and memory 152, which may be any combination of non-volatile memory or storage and volatile memory or storage. The non-volatile memory may include a combination of read-only memory (ROM) and/or flash memory.

The memory 152 may include a variety of modules that, when executed by the processor 148 of the barcode reader 10, 11, enable the operation of the barcode reader 10, 11. Such modules may include, for example, kernel/drivers 160, an image capture module 162, an image buffer 170, a decoder module 180, an object detection system 181, accessory protocol code 192, and/or an accessory authentication system 182. These modules may be stored in any combination of volatile and non-volatile memories. Some modules may be stored in both volatile and non-volatile memories, for example, with permanent storage of the module in a non-volatile memory and a temporary copy stored in a volatile memory for execution. In addition to or as an alternative to these modules, the memory 152 may store any number of other modules including, but not limited to, those set forth in the patent applications incorporated by reference in this application.

The kernel/drivers 160 may include an operating system and/or an embedded kernel that drives the operation of the barcode reader 10, 11. Further, the kernel/drivers 160 may include drivers for operating the various hardware components of the barcode reader 10, 11.

The image capture module 162 may control the operation of the illumination system 130 and/or the imaging system 132 to capture two-dimensional images of objects with the barcode reader 10, 11. The two-dimensional images may be stored in the image buffer 170. The image capture module 162 and/or other modules stored in the memory 152 may work in conjunction with a direct memory access (DMA) controller 164 of the processor 148. The DMA controller 164 may store data representing each image captured by the image capture module 162 in the memory 152 at an appropriate addressable storage space such that the processor 148 may subsequently attempt to process and/or decode the image.

The image buffer 170 may store the images captured by the image capture module 162. The image buffer 170 may be in a random access memory (RAM) component (i.e., volatile memory component) of the memory 152.

The decoder module 180 may be used to undertake processing and decoding of an image of a barcode captured by the image capture module 162. The decoder module 180 may determine whether a symbol exists within the image, identify the type of barcode present in the image, and decode the barcode to extract the desired data (for example, barcode data).

The externally powered barcode reader 10, 11 may also include an authentication system 182. The authentication system 182 may be stored in the memory 152 and may be executed by the processor 148. Alternatively, the authentication system 182 may be a separate co-processor (separate from the system package 146) implemented in a separate silicon die and package, as shown in FIG. 2. Such an authentication system 182 may include a processor 183 and memory storing a private encryption key 184 and an authentication process 186 for execution by the processor 183. The authentication system 182 is configured to receive an authentication challenge from a host computer 28 (e.g., a remote device), subject the authentication challenge to an authentication algorithm to obtain an authentication response, and send the authentication response in response to the authentication challenge to the host computer 28. The authentication response identifies the barcode reader 10, 11 as a trusted accessory to the host computer 28. A more detailed discussion of the authentication system 182 and its functions are included herein.

The accessory protocol code 192 may be stored in the memory 152 and executed by the processor 148. The accessory protocol code 192, when executed by the processor 148, enables communication with an operating system 36 of the host computer 28 and provision of the decoded data of the barcode image to an application 38*a*, 38*b* operating on the host computer 28 using an accessory communication protocol. The accessory protocol code 192 may implement a communication protocol specific to the host computer 28 when communicating with the host computer 28. A more detailed discussion of the accessory protocol code 192 and its functions are included herein.

The externally powered barcode reader 10, 11 may also include operating power management circuits 172 and a power/data interface 174. The power/data interface 174 may be a combined power and data connector with a power interface 174*a* and a data interface 174*b*. The power interface 174*a* is coupled to the operating power management circuits 172 and the data interface 174*b* is coupled to the applicable driver of the hardware circuits 150.

The operating power management circuits 172 receive, from an external power source 26 (in FIGS. 1A and 1B) through the power interface 174*a* of the power/data interface 174, all (or substantially all) power required for operating the barcode reader 10, 11 (i.e., powering each element represented in FIG. 2) as the power is used for powering the barcode reader 10, 11. More specifically, because the barcode reader 10, 11 does not include a battery for operation, the external power received by the operating power management circuits 172 may be used for operating the barcode reader 10, 11 (i.e., powering the systems shown in FIG. 2) at substantially the same time as it is received from the external power source 26. The operating power management circuits 172 may include power conversion circuitry to convert operating power received from an external power source 26 into multiple operating power levels and provide an appropriate power level to different components of the barcode reader 10, 11.

As described in FIGS. 1A and 1B, even though the externally powered barcode reader 10, 11 receives its operating power from an external power source 26 through a cable 20 and the power/data interface 174, the externally powered barcode reader 10, 11 may utilize a wireless communication link 40 for communicating decoded data to a host computer 28.

In one embodiment, communication of decoded data obtained from an image of a barcode with a host computer 28 requires that a barcode reader 10, 11: i) authenticate itself to the host computer 28 as a trusted accessory; and ii) communicate using a communication protocol that is operable only after the barcode reader 10, 11 has authenticated to the host computer 28 as a trusted accessory (i.e., after obtaining status of a trusted accessory or device to the host computer 28). More specifically, at least one of the host computer 28 and the barcode reader 10, 11 may not communicate using the communication protocol until mutual authentication of the barcode reader 10, 11 and the host computer 28 as a trusted entity is successfully completed.

Figure 3:
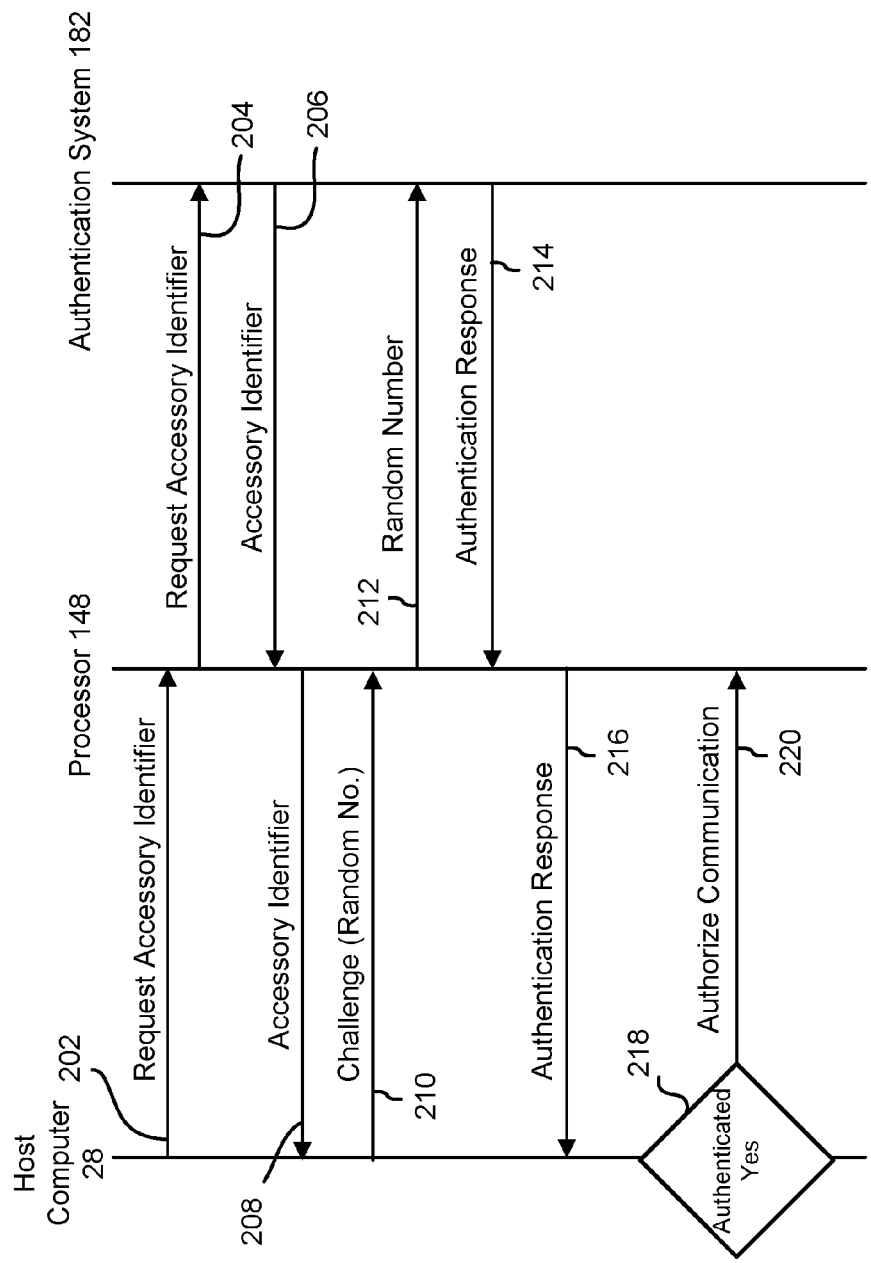
FIG. 3 is a ladder diagram representing an authentication procedure for authenticating the barcode reader to a host computer as a trusted accessory in accordance with one embodiment.

FIG. 3 is a ladder diagram representing an authentication procedure for authenticating a barcode reader 10, 11 to a host computer 28 as a trusted accessory in accordance with one embodiment. The host computer 28 and the authentication system 182 (or alternatively the processor 148) of the barcode reader 10, 11 establish mutual authentication using an authentication protocol. Any authentication protocol that is currently available or that will be developed in the future may be used for this purpose. An example authentication procedure will be explained with reference to FIG. 3 in conjunction with FIGS. 1A, 1B and 2, but it should be noted that the procedure shown in FIG. 3 is provided as an example, and any other authentication procedure may be performed to establish a mutual authentication between the barcode reader 10, 11 and the host computer 28. The host computer 28 sends a request for accessory identification at step 202. This request may be sent when a communication link is first established between the barcode reader 10, 11 and the host computer 28, which may be at: i) a connection of the point-to-point interface cable (e.g., a UART, USB, or similar connection); ii) a formation of a wireless point-to-point link (e.g., a formation of a Bluetooth (IEEE 802.15), Wi-Fi Direct, or a similar link); iii) a formation of a TCP/IP connection over a Wi-Fi (IEEE 802.11) and/or Ethernet or other IP enabled network; or iv) a similar initial connection.

In response to the request, the processor 148 of the barcode reader 10, 11 may query the authentication system 182 for an accessory identifier at step 204. The accessory identifier may be generated by the authentication system 182 and/or may be a digital certificate.

The authentication system 182 may then return the accessory identifier to the processor 148 of the barcode reader 10, 11 at step 206. Communication between the processor 148 and the authentication system 182 (which may be a co-processor) may be performed by way of Inter-Integrated Circuit (I²C) communication over an internal bus.

The processor 148 of the barcode reader 10, 11 may then return the accessory identifier to the host computer 28 over a communication link (e.g., a hardwired or wireless link such as the wireless communication link 40) at step 208.

After validating the accessory identifier, the host computer 28 may send an identification challenge to the processor 148 of the barcode reader 10, 11 over the communication link (e.g., a hardwired or wireless link such as the wireless communication link 40) at step 210. The identification challenge may be a random number encrypted with a public encryption key of the digital certificate.

The processor 148 may then present the authentication challenge to the authentication system 182 via an internal bus at step 212.

The authentication system 182 may then generate and return an authentication challenge response to the processor 148 via the internal bus at step 214. Step 214 may include decrypting the authentication challenge using its private encryption key 184 and an authentication process 186 (e.g., a predetermined encryption/decryption algorithm) to recover the random number and return the random number to the host computer 28. The authentication challenge response may be encrypted using the public key of the host private/public key pair.

The processor 148 may then provide the authentication challenge response to the host computer 28 via the communication link (e.g., a hardwired or wireless link such as the wireless communication link 40) at step 216.

The host computer 28 may then determine at step 218 whether the barcode reader 10, 11 is a trusted accessory based on the authentication challenge response (i.e., whether the random number returned by the barcode reader 10, 11 matches the original random number provided by the host computer 28).

If the barcode reader 10, 11 has properly authenticated as a trusted accessory, the host computer 28 may authorize communication with the barcode reader 10, 11 over the communication link (e.g., a hardwired or wireless link such as the wireless communication link 40) at step 220.

Figure 4A:
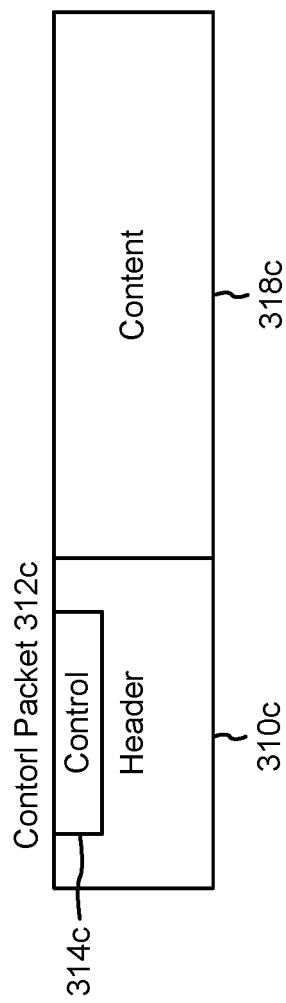
FIGS. 4A and 4B depict example packet formats for communication between the barcode reader and the host computer.
Figure 4B:
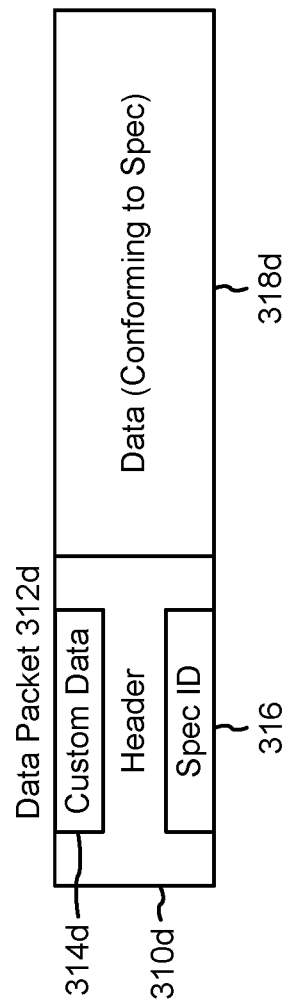

FIGS. 4A and 4B depict example packet formats for communication between a barcode reader 10, 11 and a host computer 28. The barcode reader 10, 11 and the host computer 28 may exchange data packets 312d and control packets 312c over a communication link (e.g., a hardwired or wireless link such as the wireless communication link 40) in accordance with a communication protocol. The communication of packets may follow authentication between the barcode reader 10, 11 and the host computer 28 as a trusted accessory. The communication protocol (i.e., the accessory protocol code) used between the barcode reader 10, 11 and the host computer 28 may be a non-proprietary communication protocol or a proprietary communication protocol (such as the iPod® Accessory Protocol (iAP or iAP2) or the like). When communicating using a communication protocol (either proprietary or non-proprietary), the decoded image data may be encapsulated in a data frame. For example, the encapsulation of the decoded image data in a data frame may be in conformity with iAP or iAP2.

The communication protocol implemented between the processor 148 of the barcode reader 10, 11 and the processor 34 of the host computer 28 define a packet format for control packets 312c and data packets 312d. A packet 312c, 312d may include a header 310c, 310d and a payload 318c, 318d. The header 310c, 310d may include a control/data designation 314c, 314d, which identifies whether the packet is a control packet 312c or a data packet 312d. The header 310d of a data packet 312d may also include a specification ID 316, which is a unique identifier that is assigned to the barcode reader 10, 11 and that identifies the type of specifications of data 318d included in the packet 312d (i.e. the specifications to which the data 318d will conform).

If the control/data designation 314c, 314d of a packet provided by the barcode reader 10, 11 to the host computer 28 indicates that the packet is a control packet (control/data designation 314c), the packet is delivered to the operating system 36 of the host computer 28. If the control/data designation 314c, 314d of a packet provided by the barcode reader 10, 11 to the host computer 28 indicates that the packet is a data packet (control/data designation 314d), the specification ID 316 identifies the type of specifications of data 318d included in the packet 312d (i.e. the specifications to which the data 318d will conform), and the host computer 28 (more specifically, the operating system 36 of the host computer 28) delivers the data packet 312d to an application 38a or 38b operating on the host computer 28 based on predefined criteria. The predefined criteria may be that the application 38a, 38b running on the processor 34 of the host computer 28 is identified as an application designated to accept data packets with the assigned specification ID 316 and is capable of processing the data 318d conforming with the specifications associated with the assigned specification ID 316.

If the proprietary communication protocol is iAP2, the specification ID 316 is assigned by Apple to the model of the barcode reader 10, 11 when the barcode reader is certified as a made-for-iPhone, -iPod, -iPad, or similar devices and the specification to which data 318*d* is provided by the model of the barcode reader 10, 11 conform.

The same applies to the packets transmitted from the host computer 28 to the barcode reader 10, 11. When a packet 312*c*, 312*d* is communicated from the host computer 28 to the barcode reader 10, 11 over the wireless communication link 40, control packets 312*c* may be used by the accessory protocol code 192 and data packets 312*d* may be used by other portions of the software or firmware in the barcode reader 10, 11. For example, the applications 38*a*, 38*b* running on the host computer 28 may send configuration commands to the barcode reader 10, 11. From the perspective of the accessory protocol code, those commands are just data, and other portions of the barcode reader 10, 11 that use that data may recognize it as configuration commands.

Figure 5:
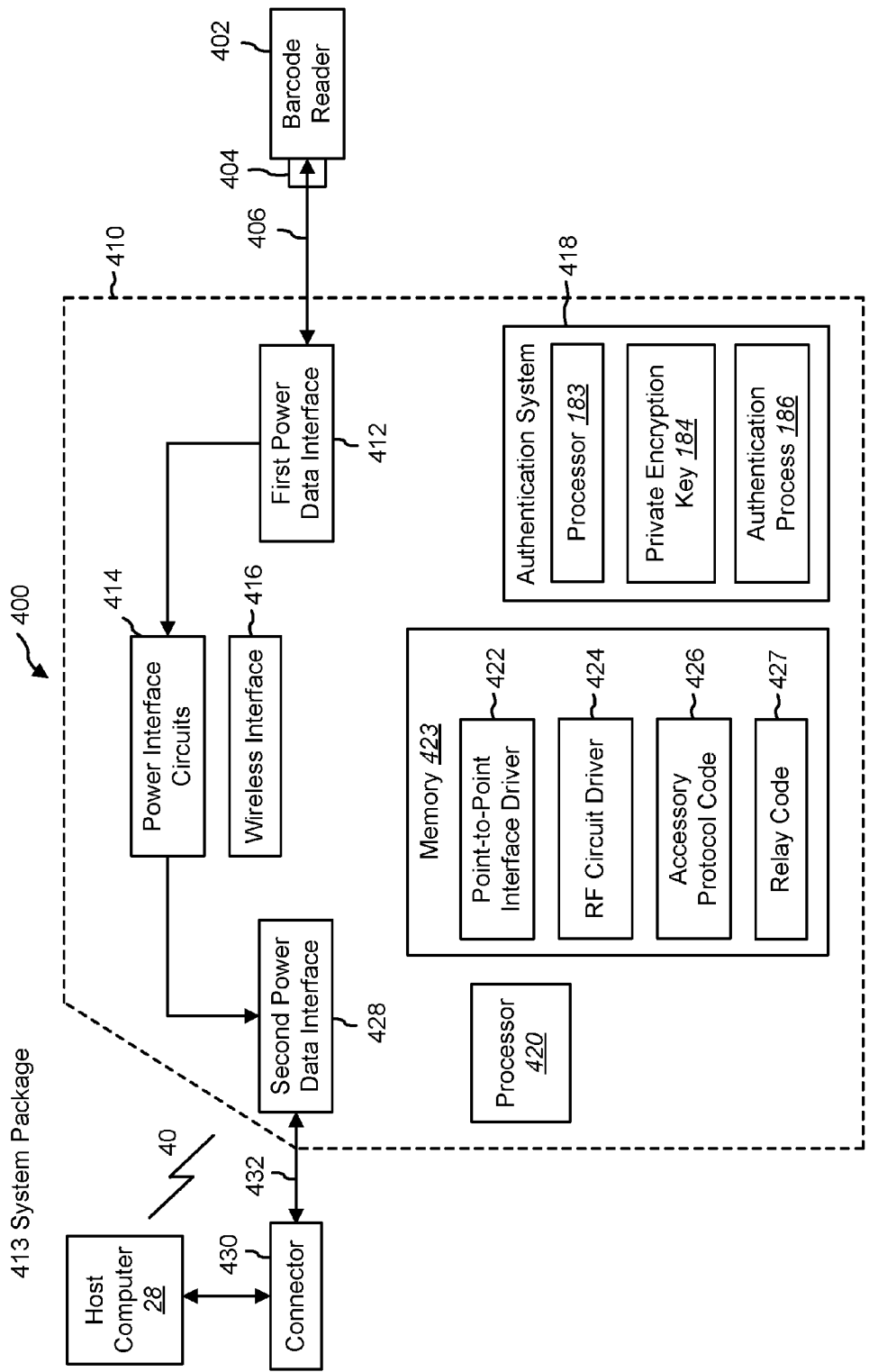
FIG. 5 depicts an example power/data cable in accordance with one embodiment.

FIG. 5 depicts an example power/data cable accessory 400 in accordance with one embodiment. The power/data cable accessory 400 (i.e., an accessory for a barcode reader 402) may be used for operation with any barcode reader 402 (i.e., an externally powered or battery powered barcode reader, or a barcode reader with or without wireless connectivity). The power/data cable accessory 400 may be used to connect a barcode reader 402 and a host computer 28 as a trusted accessory to the host computer 28, for example, to provide decoded data to the host computer 28 and/or to connect the barcode reader 402 to a power source.

The power/data cable accessory 400 may include a first power/data connector 404, a second power/data connector 430, an interface system 410, a first cable 406, and a second cable 432. The first power/data connector 404 connects to the barcode reader 402 and the second power/data connector 430 connects to a power source or a host computer 28 (which may also be a power source).

FIG. 5 depicts one embodiment wherein the interface system 410 is included between the connectors 404, 430, with the cable 406 coupling the interface system 410 to the first power/data connector 404 and the cable 432 coupling the interface system 410 to the second power/data connector 430. This arrangement is also depicted in FIG. 6C.

Alternatively, the interface system 410 may be included in either one of the power/data connectors 404 or 430 as shown in FIGS. 6A and 6B. In this case, the power/data cable accessory 400 may include a single cable 405 connecting the power/data connectors 404, 430.

Each cable of the power/data cable accessory 400 (cables 406, 432, 405) may include multiple conductors, for example four conductors as described in FIG. 1C. For example, the power/data connectors 404, 430 may each be a standard USB connector that supports both a power interface and a serial data interface over a combination of four conductors. As such, the first power/data connector 404 in combination with the four-conductor cable 406 (or 405) may provide power to the barcode reader 402 and interfacing serial data between the barcode reader 402 and the interface system 410 of the power/data cable accessory 400.

The second power/data connector 430 in combination with the four-conductor cable 432 may provide power to the interface system 410 when the power/data connector 430 is connected to a power source that provides USB compliant power, such as a computer USB port, or a transformer providing USB compliant power when plugged into a standard AC power source (e.g., a wall outlet). The transformer may be separate from the second connector 430 or may be an integral part of the second connector 430.

The second power/data connector 430 in combination with the four-conductor cable 432 may further, when the power/data connector 430 is coupled to a host computer 28, provide serial communications with the host computer 28 as described herein.

The interface system 410 (i.e., a relay communication system) includes a first power data interface 412 for interfacing with the barcode reader 402 via the first power/data connector 404 (and cable 405 in the embodiment of FIG. 6A and cable 406 in the embodiment of FIG. 6C), and a second power data interface 428 for interfacing with a power source or a host computer 28 via the second connector 430 (and cable 405 in the embodiment of FIG. 6B and cable 432 in the embodiment of FIG. 6C). In one embodiment, the power data interfaces 412, 428 may be USB interfaces and the cables 406, 432, 405 may be USB cables.

The interface system 410 may also include power interface circuits 414, wireless interface 416 (RF circuits), a processor 420, and memory 423, which may include: i) a point-to-point interface driver 422, ii) an RF circuit driver 424, iii) accessory protocol code 426, and/or iv) relay code 427. The memory 423 may be any combination of non-volatile memory or storage and volatile memory or storage. The non-volatile memory may include a combination of read-only memory (ROM) and/or flash memory. The memory 423 may be a non-transitory computer-readable medium.

Each of the above components may be implemented in one or more silicon dies and with one or more silicon dies implemented in one or more chip packages.

The power interface circuits 414 receive power from the second power data interface 428, which is coupled to a power source via the second connector 430. The power interface circuits 414 draw operating power from the power source for both: i) providing operating power to the components of the interface system 410; and ii) providing operating power to the barcode reader 402 through the first power data interface 412 and the first connector 404.

For example, the power interface circuits 414 may receive operating power compliant with the USB specification (i.e. 5 V, at least 500 mA) and: i) convert a portion of that power to the applicable power levels (appropriate voltage and minimum amperage) required for each component of the interface system 410; and ii) provide a portion of the power to the first power data interface 412 in accordance with the USB specification (i.e. 5 V, at least 500 mA) as operating power to be provided to the barcode reader 402 via the connector 404. Because the power interface circuits 414 may also draw power for the interface system 410 from the power source and provide a portion of the power drawn from the power source as the operating power to the interface system 410, the portion of the power drawn from the power source that is available for provision to the barcode reader 402 is less than 100% by the amount of power required for operation of the interface system 410.

In an alternative embodiment, the power specification for the power drawn by the second power data interface 428 from the power source and the power provided to the barcode reader 402 via the first power data interface 412 may not be the same power specification. For example, the power drawn by the second power data interface 428 may comply with the USB specification (5V, at least 500 mA) while the power provided to the barcode reader 402 via the first power data interface 412 may be of a different voltage and an applicable minimum amperage. In such an embodiment, the power interface circuits 414 further convert power drawn from the power source to the applicable power specification for providing operating power to the barcode reader 402.

The power source may be the host computer 28 or a standard AC power source (e.g., a wall outlet) combined with a transformer such that the power interface circuits 414 may draw the operating power for the barcode reader 402 and the interface system from the host computer 28 or the standard AC power source.

The first power data interface 412 in combination with the processor 420 executing the point-to-point interface driver 422 may comprise a Universal Serial Bus (USB), a Universal Asynchronous Receiver/Transmitter (UART), or other point-to-point communication interface to enable the interface system 410 to establish a point-to-point connection with the barcode reader 402 via the connector 404 and, when applicable, operate as a master (for example, as a USB master if the point-to-point protocol is a USB) for communication with the barcode reader 402 operating as a slave (for example, as a USB slave if the point-to-point protocol is USB).

In operation, the interface system 410 (which may be a USB host) interfaces with the barcode reader 402 in the same way the barcode reader 10 would interface with a host computer 28. The interface system 410 provides operating power to the barcode reader 402 through the first connector 404 and receives decoded data of an image of a barcode from the barcode reader 10 through the first connector 404.

In exemplary embodiments the interface system 410 may interface with a host computer (such as host computer 28) via: i) the second power data interface 428 and the connector 430 being coupled to the host computer 28; or ii) a wireless communication link 40 between the wireless interface 416 of the interface system 410 and the wireless interface 32 of the host computer 28.

In an embodiment where the interface system interfaces with the host computer 28 via the second power data interface 428 and the connector 430 being coupled to the host computer 28, the second power data interface 428 in combination with the processor 420 executing the point-to-point interface driver 422 may comprise a Universal Serial Bus (USB), a Universal Asynchronous Receiver/Transmitter (UART), or other point-to-point communication interface to enable the interface system 410 to establish a point-to-point connection with the host computer 28 via the connector 430 and, when applicable, operate as a master or slave (for example, as a USB master or USB slave if the point-to-point protocol is USB) for communication with the host computer operating in the opposite role (for example: i) as a USB slave if the point-to-point protocol is USB and the interface system 410 is operating as a USB master; or ii) as a USB master if the point-to-point protocol is USB and the interface system 410 is operating as a USB slave).

When the interface system 410 operates as a USB slave, it may emulate a barcode reader and interface with the host computer 28 in the same way a barcode reader 10 (with appropriate authentication) would interface with the host computer 28.

In an embodiment where the interface system 410 interfaces with the host computer 28 via a wireless communication link 40 between the wireless interface 416 of the interface system 410 and the wireless interface 32 of the host computer 28, each may operate a wireless communication protocol (e.g. Bluetooth®, IEEE 802.11, or any other wireless communication protocol, to: i) establish a communication link between the wireless interface 416 of the interface system 410 and the corresponding wireless interface 32 of the host computer 28; and ii) enable application level communication between the interface system 410 and the host computer 28. In one embodiment, the application level communication may be, for example, by way of USB framing or other emulation.

To support such wireless communications, the wireless interface 416 (in combination with the processor 420 executing the RF circuit driver 424) may be: i) a wireless point-to-point transceiver such as Bluetooth® (IEEE 802.15), Wi-Fi direct, or a similar point-to-point protocol which, when operated in conjunction with the processor 420 executing the RF circuit driver 424, enables the accessory 400 to establish a wireless communication link 40 (e.g., a wireless point-to-point communication link) with, and communicate over the link with, a host computer; and/or ii) a wireless LAN transceiver such as Wi-Fi (IEEE 802.22) or similar, which, when operated in conjunction with the processor 420 executing the RF circuit driver 424, enables the accessory 400 to be an addressable endpoint on a wireless local area network and to communicate with a host computer through a wireless LAN using, as an example, Transmission Control Protocol/Internet Protocol (TCP/IP) connections or the like over a Wi-Fi or similar network. The RF circuit driver 424 is the code for operating the wireless interface 416.

Figure 9:
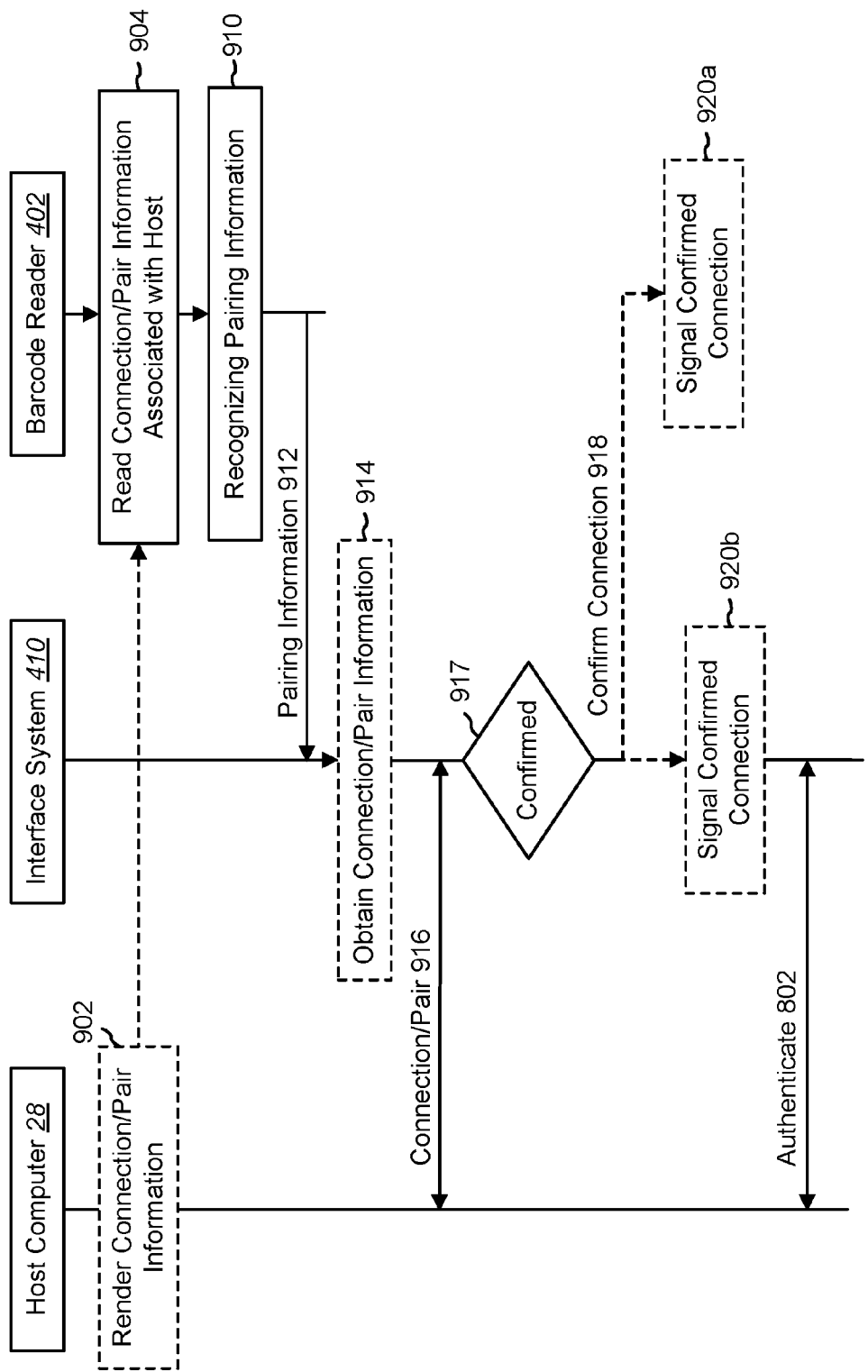
FIG. 9 depicts establishing a wireless communication link between an accessory and a host computer in accordance with one embodiment.
Figure 10:
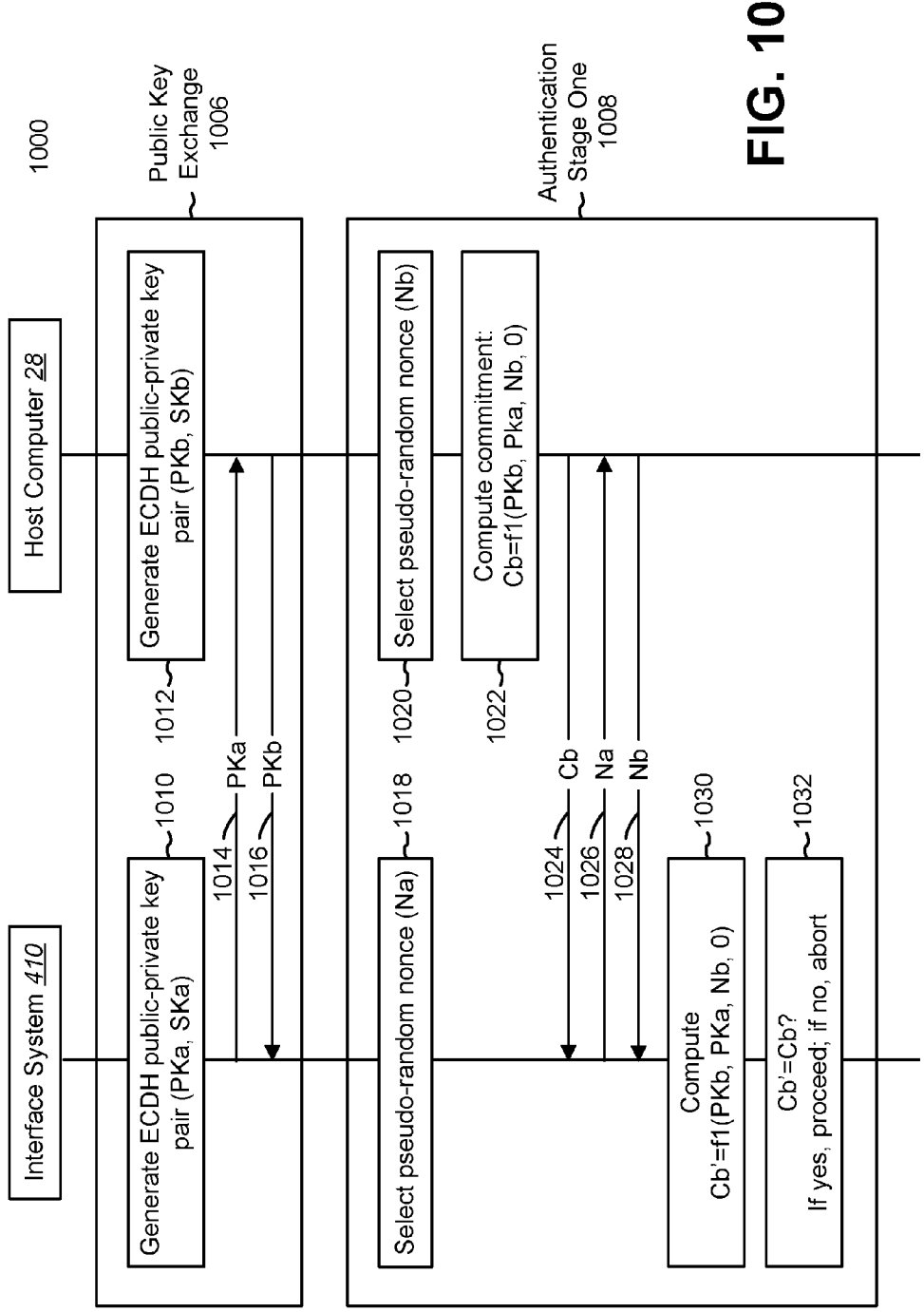
FIG. 10 depicts establishing a wireless communication link between an accessory and a host computer in accordance with an alternative embodiment.
Figure 11:
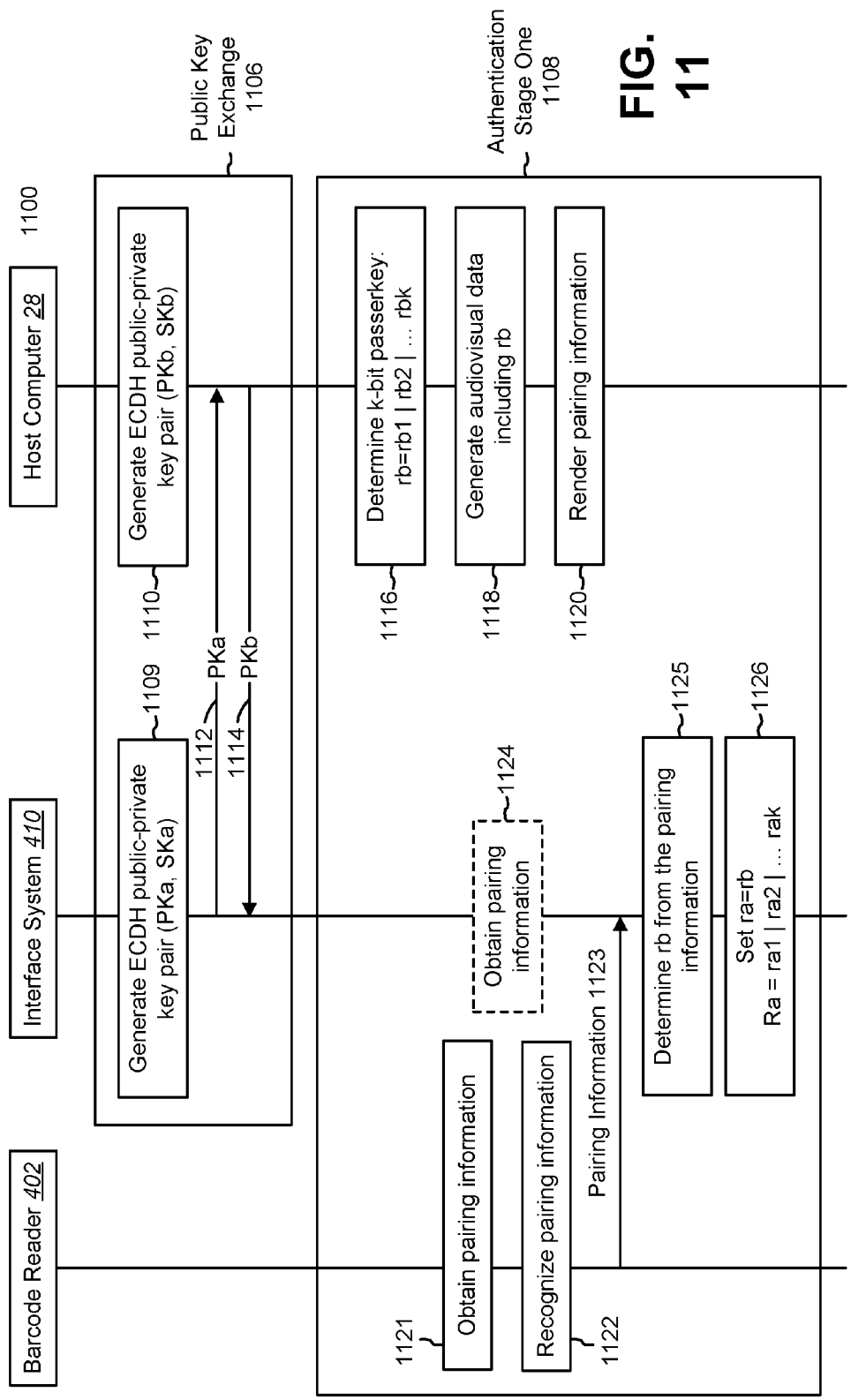
FIG. 11 depicts establishing a wireless communication link between an accessory and a host computer in accordance with an alternative embodiment.

Embodiments of operation for establishing the wireless communication link 40 between the accessory 400 and the host computer 28 is described in more detail with respect to FIGS. 9, 10, and 11.

The interface system 410 may further include an authentication system 418 which may be similar to the authentication system 182 described in FIG. 2 and which may be used to authenticate and implement a proprietary communication protocol for communications between the host computer 28 and the interface system 410 through the hardwired interface (e.g. the second power data interface 428 and the connector 430 coupled to the host computer 28) or the wireless communication link 40. The proprietary communication protocol may be the iPod® Accessory Protocol (iAP or iAP2).

The authentication system 418 may be stored in the memory 423 and executed by the processor 420. Alternatively, the authentication system 418 may be a separate coprocessor (implemented on a separate silicon die and/or chip package from the processor 420 and memory 423) as shown in FIG. 5.

The authentication system 418 may include a processor 183 and memory storing a private encryption key 184 and an authentication process 186 for execution by the processor 183. The authentication system 418 is configured to receive an authentication challenge from a host computer 28 (e.g., a remote device), subject the authentication challenge to an authentication algorithm to obtain an authentication response, and send the authentication response in response to the authentication challenge to the host computer 28. The authentication response identifies the interface system 410 of the accessory 400 as a trusted accessory to the host computer 28, all as described in more detail with respect to FIG. 3.

The accessory protocol code 426, which is similar to accessory protocol code 192, may be stored in the memory 423 and executed by the processor 420. The accessory protocol code 426, when executed by the processor 420, enables communication with an operating system 36 of the host computer 28 and provision of the decoded data received from the barcode reader 402 (without using the proprietary accessory protocol or using a different accessory protocol) to an application 38*a*, 38*b* operating on the host computer 28 using an accessory communication protocol. The accessory protocol code 426 may implement a communication protocol specific to the host computer 28 when communicating with the host computer 28.

In one embodiment, communication between the power/data cable accessory 400 and a host computer 28 (e.g., communication of decoded data from an image of a barcode received from a barcode reader to a host computer) may be performed only after the power/data cable accessory 400 authenticates itself to the host computer 28 as a trusted accessory. More specifically, at least one of the host computer 28 and the power/data cable accessory 400 may not communicate using the communication protocol until mutual authentication of the power/data cable accessory 400 and the host computer 28 as a trusted entity is successfully completed.

The accessory protocol code 426 may implement a communication protocol specific to the host computer when communicating with the host device. For example, in the case of Apple's iOS mobile operating system, the accessory protocol code 426 may be a code for implementing iAP or iAP2 after the power/data cable accessory 400 has successfully authenticated itself as a trusted accessory to the host device.

The relay code 427, when operated by the processor 420, sends decoded data of an image of a barcode received from the barcode reader 402 to a host device, such as a host computer 28.

Figure 8:
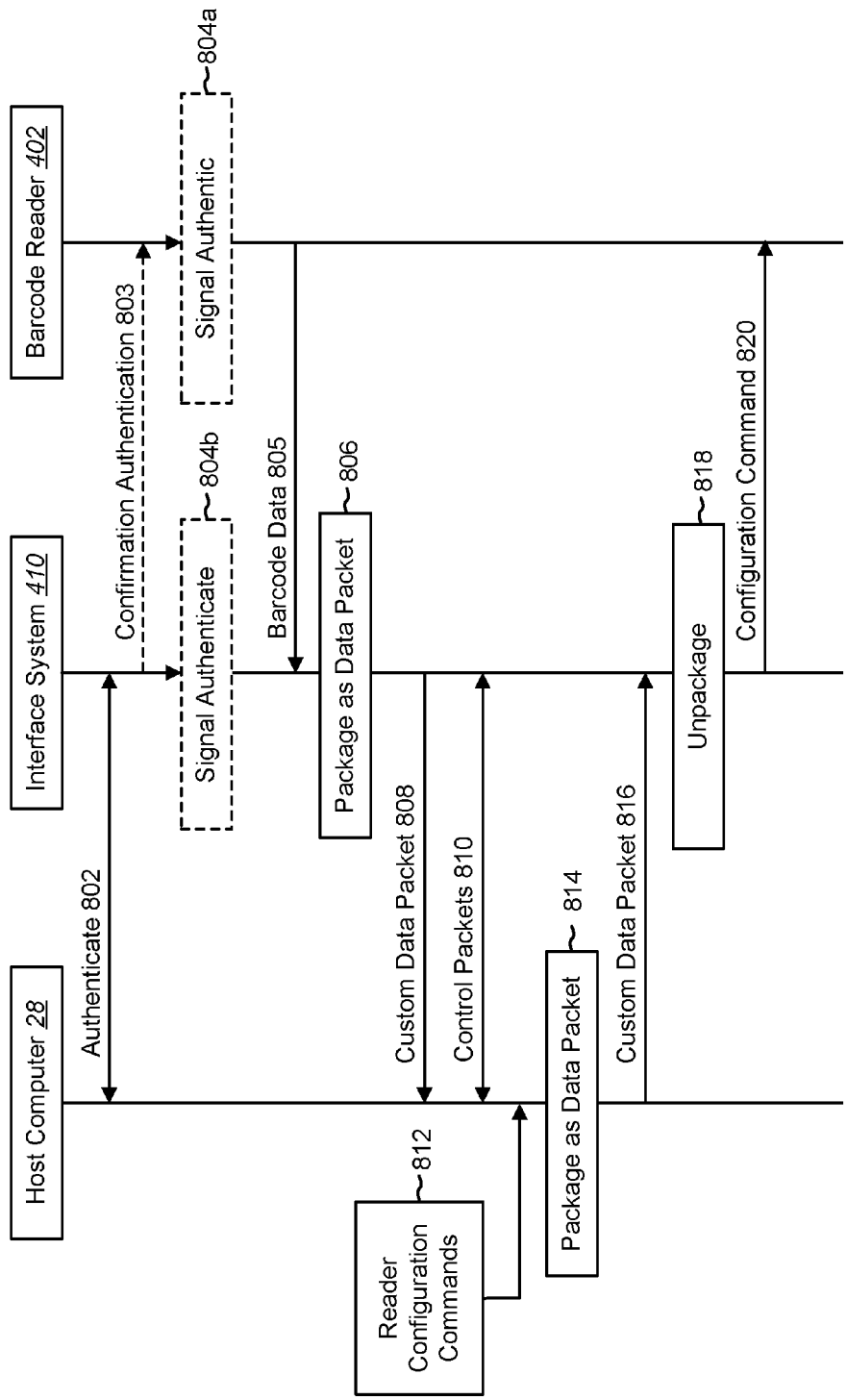
FIG. 8 depicts exemplary communication between a barcode reader, assessor and host computer in accordance with one embodiment.

Turning briefly to FIG. 8, exemplary operation of the interface system 410 and its interaction with a host computer 28 and a barcode reader 402 are represented. Step 802 represents authentication of the interface system 410 of the power/data cable accessory 400 to the host computer 28 as a trusted accessory utilizing the steps as described with respect to FIG. 3.

After authentication the power/data cable accessory 400 is capable of relaying decoded data from the barcode reader 402 to the host computer 28 and may notify the operator of this ready state.

In a first embodiment of notifying the user of the ready state: i) the interface system 410 may send a message to the barcode reader 402 (via the first power data interface 412 and the connector 404) confirming completion of authentication as represented by step 803; and ii) the barcode reader 402 may generate a signal (for example illumination of an indicator light or activation of a vibration motor) to notify the user of authentication as represent by step 804a.

In a second embodiment of notifying the user of the ready state the interface system 410 may itself generate a signal (for example illumination of an indicator light or activation of a vibration motor within a housing portion of the power/data cable accessory 400) to notify the user of authentication as represented by step 804b.

Thereafter, the interface system 410 of the power/data cable accessory 400 may communicate with the host computer 28, utilizing the protocol previously described. In more detail, step 805 represents the barcode reader 402 providing decoded data to the interface system 410. As discussed, the interface system 410 may function as a USB host, the barcode reader 402 may function as a USB slave, and the decoded data may be provided as either keyboard data if the USB interface is logically configured as a unidirectional keyboard interface or may otherwise be recognized as decoded data if the USB interface is logically configured as a bidirectional communication interface.

Step 806 represents the relay code 427 packaging the decoded data as a custom data packet as previously described. This may include, as described with respect to FIG. 4b, formatting and/or supplementing the decoded data so that it conforms to the specification ID 316 and adding a header to the data which includes identification of the packet as a custom data packet and the specification ID 316. Step 808 represents transmission of the custom data packet to the host computer 28.

In another aspect of operation, step 810 represents the host computer 28 and the interface system 410 exchanging control packets as described with respect to FIG. 4A.

In yet another aspect of operation, a control or configuration application operating on the host computer 28 may generate configuration control commands for the barcode reader 402, as represented by step 812.

Step 814 represents the host computer 28 packaging the control or configuration commands as custom data packets as previously described. This may include, as described with respect to FIG. 4b, formatting and/or supplementing the control or configuration commands so that they conform to the specification ID 316 and adding a header to the data which includes identification of the packet as a custom data packet and the specification ID 316. Even though a configuration or control command may be a control command to the barcode reader 402, it is data for purposes of the protocol communications between the interface system 410 and the host computer 28. Step 816 represents transmission of the custom data packet to the interface system 410.

Step 818 represents the relay code 427 un-packaging the control or configuration commands and step 820 represents provision of the control or configuration commands to the barcode reader 402 over a bidirectional interface.

Figure 7A:
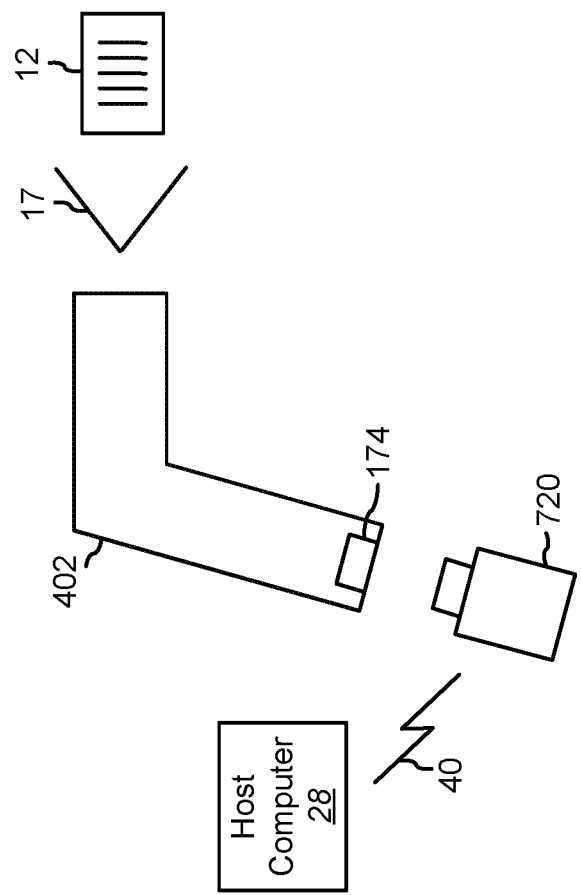
FIGS. 7A and 7B show a battery powered barcode reader in accordance with one embodiment.

FIG. 7A shows a barcode reader 402 coupled to a battery pack accessory 720. The barcode reader 402 is a traditional externally powered barcode with a power data interface 174 for coupling to a power data connector such as a connector 404 of an accessory 400.

Figure 7B:
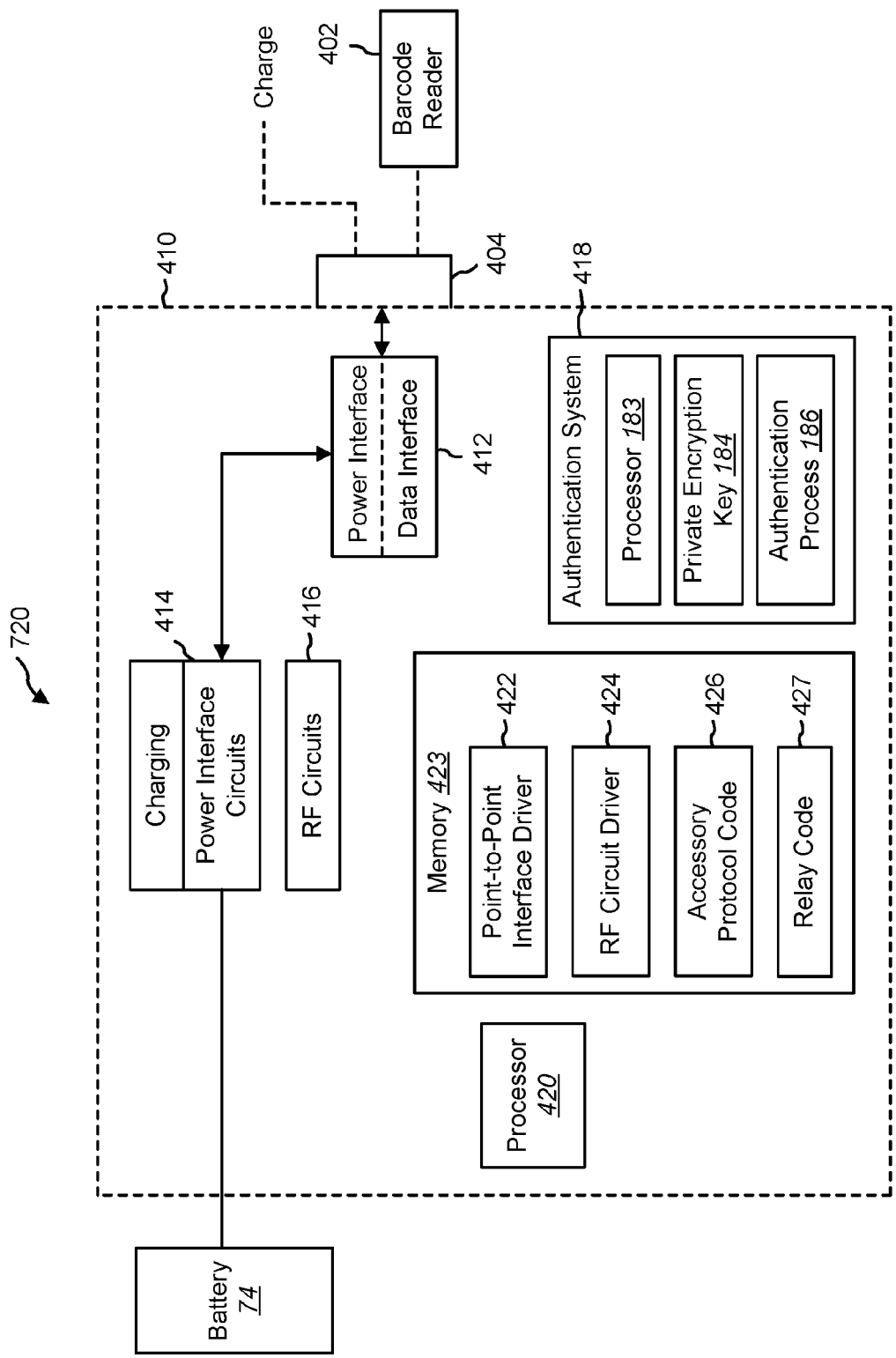

FIG. 7B depicts an example battery pack accessory 720 in accordance with one embodiment. The battery pack accessory 720 may be used for operation with any barcode reader 710 (an externally powered or battery powered barcode reader, or a barcode reader with or without wireless connectivity). The battery pack accessory 720 may: i) provide operating power to the barcode reader 710; and ii) be used to connect the barcode reader 710 with a host computer 28 as a trusted accessory to the host computer 28, for example, to provide decoded data to the host computer 28 and/or to provide operating power to the barcode reader 402.

The battery pack accessory 720 may include a power/data connector 404 for connecting to the barcode reader 402, an interface system 410, and a power source such as a rechargeable battery 721. The battery pack accessory 720 may further include an additional mechanical coupling (not shown) for securing the battery pack accessory 720 to the barcode reader 402 in a manner in which the power/data connector 404 remains securely attached to the barcode reader 402 without exceeding mechanical stress limits of the connector 404 or the mating connector on the barcode reader 402.

The power/data connector 404 may be a standard USB connector that supports both a power interface and a serial data interface with the barcode reader 402 over a combination of four conductors. As such, the power/data connector 404 may provide power to the barcode reader 402 and interface serial data between the barcode reader 402 and the interface system 410 of the battery pack accessory 720. Further, the power/data connector 404 may provide a coupling to a remote charger for providing power to charge the battery 721 when the power/data connector 404 is not coupled to the barcode reader 402. In the alternative the battery pack accessory 720 may include a separate connector or conductive contacts for coupling to charging power.

The interface system 410 (i.e., a relay communication system) includes a power data interface 412 for interfacing with the barcode reader 402 via the power/data connector 404. In one embodiment, the power data interface 412 may be a USB interface.

The interface system 410 may also include power interface circuits 414, wireless interface 416, a processor 420, and memory 423 which may include: i) a point-to-point interface driver 422, ii) an RF circuit driver 424, iii) accessory protocol code 426, and/or iv) relay code 427. The memory 423 may be any combination of non-volatile memory or storage and volatile memory or storage. The non-volatile memory may include a combination of read-only memory (ROM) and/or flash memory. Each of the above components may be implemented in one or more silicon dies and with one or more silicon dies implemented in one or more chip packages.

The power interface circuits 414 receive charging power from the power data interface 412 which is coupled to a charging power source via the second connector 404 or alternative conductive contacts. The power interface circuits 414 convert the charging power to a power specification applicable for charging the battery 721.

The power interface circuits 414 further receive operating power from the battery 721 and: i) convert a portion of that power to the applicable power levels (appropriate voltage and minimum amperage) required for each component of the interface system 410; and ii) provide a portion of the power to the power data interface 412 in accordance with the USB specification (i.e. 5 V, at least 500 mA) as operating power to be provided to the barcode reader 402 via connector 404. Because the power interface circuits 414 may also draw power for the interface system 410 from the battery 721 and provide a portion of the power drawn from the battery 721 as the operating power to the interface system 410, the portion of the power drawn from the battery 721 that is available for provision to the barcode reader 402 is less than 100% by the amount of power required for operation of the interface system 410.

In an alternative embodiment, the power specification for the power drawn by from the battery 721 and the power provided to the barcode reader 402 via the power data interface 412 may not be the same power specification. In such an embodiment, the power interface circuits 414 further convert power drawn from the battery 721 to the applicable power specification for providing operating power to the barcode reader 402.

The power data interface 412 in combination with the processor 420 executing the point-to-point interface driver 422 may comprise a Universal Serial Bus (USB), Universal Asynchronous Receiver/Transmitter (UART), or other point-to-point communication interface to enable the interface system 410 to establish a point-to-point connection with the barcode reader 402 via the connector 404 and, when applicable, operate as a master (for example, as a USB Master if the point-to-point protocol is USB) for communication with the barcode reader 402 operating as a slave, (for example, as a USB slave if the point-to-point protocol is USB).

In operation, the interface system 410 (which may be a USB host) interfaces with the barcode reader 402 in the same way the barcode reader 10 would interface with a host computer 28. The interface system 410 provides operating power to the barcode reader 10 through the connector 404 and receives decoded data of an image of a barcode from the barcode reader 10 through the first connector 404.

In exemplary embodiments the interface system 410 may interface with a host computer (such as host computer 28) via a wireless communication link 40 between the wireless interface 416 of the interface system 410 and wireless interface 32 of the host computer 28. The wireless interface 416 of the interface system 410 and wireless interface 32 of the host computer 28 each may operate a wireless communication protocol (e.g. Bluetooth®, IEEE 802.11, or any other wireless communication protocol to: i) establish a communication link between the wireless interface 416 of the interface system 410 and the corresponding wireless interface 32 of the host computer 28; and ii) enable application level communication between the interface system 410 and the host computer 28. In one embodiment, the application level communication may be, for example, by way of USB framing or other emulation.

To support such wireless communications, the wireless interface 416 (in combination with the processor 420 executing RF circuit driver 424), may be: i) a wireless point-to-point transceiver such as Bluetooth® (IEEE 802.15), Wi-Fi direct, or a similar point-to-point protocol which, when operated in conjunction with the processor 420 executing the RF circuit driver 424 enables the accessory 400 to establish a wireless communication link 40 (e.g., a wireless point-to-point communication link) with, and communicate over the link with, a host computer; and/or ii) a wireless LAN transceiver such as Wi-Fi (IEEE 802.11) or similar which, when operated in conjunction with the processor 420 executing the RF circuit driver 424 enables the accessory 400 to be an addressable endpoint on a wireless local area network and to communicate with a host computer through a wireless LAN using, as an example, Transmission Control Protocol/Internet Protocol (TCP/IP) connections or the like over a Wi-Fi. The RF circuit driver 424 is the code for operating the wireless interface 416.

Embodiments of operation for establishing the wireless communication link 40 between the accessory 400 and the host computer 28 is described in more detail with respect to FIGS. 9, 10, and 11.

The interface system 410 may further include an authentication system 418 which may be similar to the authentication system 182 described in FIGS. 2 and 418 of FIG. 5 and is used to authenticate and implement a proprietary communication protocol for communications between the host computer 28 and the interface system 410 through the hardwired interface (e.g. the second power data interface 428 and the connector 430 coupled to the host computer 28) or the wireless communication link 40. The proprietary communication protocol may be the iPod® Accessory Protocol (iAP or iAP2).

The authentication system 418 may be stored in memory 423 and executed by the processor 420. Alternatively, the authentication system 418 may be a separate coprocessor (implemented on a separate silicon die and/or chip package from the processor 420 and memory 423) as shown in FIG. 7B.

The authentication system 418 may include a processor 183 and memory storing a private encryption key 184 and an authentication process 186 for execution by the processor 183. The authentication system 418 is configured to receive an authentication challenge from a host computer 28 (e.g., a remote device), subject the authentication challenge to an authentication algorithm to obtain an authentication response, and send the authentication response in response to the authentication challenge to the host computer 28. The authentication response identifies the interface system 410 of the accessory 400 as a trusted accessory to the host computer, all as described in more detail with respect to FIG. 3.

The accessory protocol code 426, which is similar to accessory protocol code 192, may be stored in the memory 423 and executed by the processor 420. The accessory protocol code 426, when executed by the processor 420, enables communication with an operating system 36 of the host computer 28 and provision of the decoded data received from the barcode reader 10 (without using the proprietary accessory protocol or using a different accessory protocol) to an application 38a, 38b operating on the host computer 28 using an accessory communication protocol. The accessory protocol code 426 may implement a communication protocol specific to the host computer 28 when communicating with the host computer 28.

In one embodiment, communication between the battery pack accessory 720 and the host computer 28 (e.g., communication of decoded data from an image of a barcode received from a barcode reader to a host computer) may be performed only after the battery pack accessory 720 authenticates itself to the host computer 28 as a trusted accessory. More specifically, at least one of the host computer 28 and the battery pack accessory 720 may not communicate using the communication protocol until mutual authentication of the battery pack accessory 720 and the host computer 28 as a trusted entity is successfully completed.

The accessory protocol code 426 may implement a communication protocol specific to the host computer when communicating with the host device. For example, in the case of iOS, the accessory protocol code 426 may be a code for implementing iAP or iAP2 after the battery pack accessory 720 has successfully authenticated itself as a trusted accessory to the host device.

The relay code 427, when operated by the processor 420, sends decoded data of an image of a barcode received from the barcode reader 10 to a host device, such as a host computer 28. The relay code 427 includes operation as described with respect to FIG. 8.

FIG. 9 depicts a first embodiment of operation of the interface system 410 of the power/data cable accessory 400 or the battery pack accessory 720 to establish a wireless communication link 40 with a host computer 28. This embodiment may include a Wi-Fi communication link, a point-to-point communication link such as Bluetooth®, or a similar link.

Step 902 represents rendering connection and/or pairing information associated with the host computer 28. In one embodiment the rendering may include, displaying on a display screen of the host, an electronic representation of a barcode (1D or 2D) that includes the connection and/or pairing information. In another embodiment the rendering may include, displaying on a display screen of the host, in an alternative format other than a barcode, the connection and/or pairing information, for example printed characters. In another embodiment the rendering may include, displaying on the display screen of the host, a barcode or an alternative rendering of a location indicator, such as a URL or a database record indicator, at, or through, which connection and/or pairing information may be obtained. In another embodiment, the rendering may include printing, or otherwise making available electronically or in hard copy, the connection and/or pairing information, or a location indicator at, or through, which connection and/or pairing information may be obtained, whether in barcode format, alternative visual format (such as printed characters), audio format, a format of modulated illumination, and/or a format of modulated electromagnetic radiation.

The connection and/or pairing information may be a URL or IP address/port number associated with the host computer 28, an identification number or other identifying code necessary or useful for identifying the host computer 28 and/or establishing a link, or encrypting or otherwise securing a link, between the interface system 410 and the host computer (for example a Bluetooth® PIN).

Step 904 represents the barcode reader 402 obtaining the rendered connection and/or pairing information for example by reading a barcode displayed on, or associated with the host computer 28. In other embodiments the barcode reader may obtain the rendered connection and/or pairing information by other means compatibly with the technology used for rendering the connection and/or pairing information.

Step 910 represents the barcode reader 402 recognizing that it has obtained connection and/or pairing information. In embodiments where the connection and/or pairing information is rendered as a barcode, it is useful for the barcode reader 402 to be able to distinguish between a barcode that contains connection and/or pairing information and a barcode that includes data which is to be read and processed in the ordinary course of use of the barcode reader 402.

In one embodiment, recognition may be based on a signal from the interface system 410. For example, if the interface system is not connected or paired with a host computer 28 it may provide a signal to the barcode reader 402 indicating that it is not connected or paired and data from a subsequent barcode read may therefore be recognized as connection and/or pairing information at step 910. To further facilitate, upon receipt of the signal from the interface system 410 the barcode reader may go into a "connection mode" wherein a signal is provided to the operator (e.g., an indicator light on the housing or a vibration indicator) indicating to the operator that the operator is to use the barcode reader 402 to read the connection and/or pairing information.

In another embodiment, recognition may be based on the format of the barcode and/or control information within the barcode. For example the connection and/or pairing information may be in a barcode format that is used exclusively for connection and/or pairing information. In another example, the connection and/or pairing information may be preceded by a character string or other indicator that is an exclusive indicator for connection and/or pairing information (or that identifies the type of connection and/or pairing to be performed) and is therefore recognized as connection and/or pairing information by the barcode reader 402.

Step 912 represents transferring the connection and/or pairing information to the interface system 410.

Step 914 represents an alternative to steps 904, 910 and 912. In certain embodiments wherein the rendering of the connection and/or pairing information is in a rendering format other than a barcode (for example audio, modulated illumination, or modulated electromagnetic radiation) the interface system 410 itself may obtain the connection and/or pairing information. For example, if the connection information is rendered by the host computer 28 as near field communication (i.e. modulation of electromagnetic radiation) the interface system 410 may contain a compatible near field communication system and obtain the connection and/or pairing information using near field communication.

Whether the connection and/or pairing information is obtained from the barcode reader 402, directly by the interface system 410, or through other means, the interface system 410 forms a connection with the host computer 28 at step 916. In an embodiment where the connection and/or pairing information is a URL or IP Address/port number, step 916 may represent forming a TCP/IP connection to the specified URL or IP address/port number via a Wi-Fi network. In an embodiment where the wireless communication link 40 is Bluetooth® and connection and/or pairing information may include any of identification of the host computer 28, a PIN number associated with the host computer 28 for forming a link-key with the host computer utilizing Bluetooth® 2.0, other information for forming a more advanced Bluetooth® connection and/or other information. In which case, step 916 represents Bluetooth® pairing to pair the devices (the interface system 410 with the host computer 28), establishing a link key, and/or otherwise establishing a wireless communication link 40.

Step 917 represents confirmation that the wireless communication link 40 has been established. Upon confirmation that the wireless communication link 40 is established, the interface system 410 may provide a confirmation that the wireless communication link 40 has been established to the barcode reader 402 at step 918 and the barcode reader 402 may signal that the wireless communication link 40 has been established (and the barcode reader 402 is ready for operation with the host computer 28) at step 920*a*.

Alternatively, the interface system 410 itself may signal that the wireless communication link 40 has been established (and the barcode reader 402 is ready for operation with the host computer 28) at step 920*b*. In either case, signaling may include illumination/modulation of an indicator light or activation of a vibration motor in a predetermined modulation pattern.

Following confirmation of the communication link the interface system 410 and the host computer 28 may complete the authentication process, if required, as described in FIG. 3 and represented by step 802.

FIG. 10 illustrates another process 1000 for pairing an electronic device, such as the interface system 410, to a host computer 28 (i.e. establishing a wireless communication link 40). In this process 1000, pairing between the interface system 410 and the host computer 28 is being performed in accordance with Bluetooth® v2.1 (or later), and the numeric comparison association model is being used.

The Bluetooth® v2.1 (or later) specification defines five phases for secure simple pairing (SSP): public key exchange, authentication stage one, authentication stage two, link key calculation, and link manager protocol (LMP) authentication and encryption.

During public key exchange 1006, the interface system 410 may generate 1010 an ECDH public-private key pair (PKa and SKa, respectively). The host computer 28 may also generate 1012 an ECDH public-private key pair (PKb and SKb, respectively). The interface system 410 may send 1014 its public key (PKa) to the host computer 28. The host computer 28 may send 1016 its public key (PKb) to the interface system 410.

During authentication stage one 1008, the interface system 410 and the host computer 28 may both select 1018, 1020 a pseudo-random nonce (Na and Nb, respectively). The host computer 28 may compute 1022 a commitment value (Cb), which may depend on PKb, PKa, and Nb. The host computer 28 may send 1024 the commitment value (Cb) to the interface system 410. The interface system 410 may send 1026 its pseudo-random nonce (Na) to the host computer 28. The host computer 28 may send 1028 its pseudo-random nonce (Nb) to the interface system 410.

The interface system 410 may compute 1030 a confirmation commitment value (Cb'), using the same function that the host computer 28 used to compute 1022 the commitment value (Cb). The interface system 410 may determine 1032 whether the confirmation commitment value (Cb') equals the commitment value (Cb) received from the host computer 28. If it does, the pairing procedure may proceed. If not, the pairing procedure may be aborted.

The interface system 410 may calculate 1034 a first confirmation value (Va). The host computer 28 may calculate 1036 a second confirmation value (Vb). Both the first confirmation value (Va) and the second confirmation value (Vb) may depend on PKa, PKb, Na and Nb.

The host computer 28 may generate 1038 and render 1040 pairing information which includes the second confirmation value (Vb). The pairing information may be rendered in any of the ways the connection and/or pairing information could be rendered as described with respect to step 902 (FIG. 9).

Step 1041 represents the barcode reader 402 obtaining the pairing information for example by reading a barcode displayed on, or associated with, the host computer 28. In other embodiments the barcode reader may obtain the pairing information by other means compatibly with the technology used for rendering the pairing information (step 1040).

Step 1042 represents the barcode reader 402 recognizing that it has obtained pairing information. As discussed, in embodiments where the pairing information is rendered as a barcode, it is useful for the barcode reader 402 to be able to distinguish between a barcode that contains pairing information and a barcode that includes data which is to be read and processed in the ordinary course of use of the barcode reader 402.

In one embodiment, recognition may be based on a signal from the interface system 410. For example, if the interface system 410 is not connected or paired with a host computer 28 it may provide a signal to the barcode reader 402 indicating that it is not connected or paired and a data from a subsequent barcode read may therefore be recognized as pairing information at step 910. To further facilitate, upon receipt of the signal from the interface system 410 the barcode reader may go into a "connection mode" wherein a signal is provided to the operator (i.e., modulation of an indicator light on the housing or a vibration indicator) indicating to the operator that the operator is to use the barcode reader 402 to read connection and/or pairing information.

In another embodiment, recognition may be based on the format of the barcode and/or control information within the barcode. For example the connection and/or pairing information may be in a barcode format that is used exclusively for connection and/or pairing information. In another example, the connection and/or pairing information may be preceded by a character string or other indicator that is an exclusive indicator for connection and/or pairing information (or identifies the type of connection and/or pairing to be performed) and is therefore recognized as connection and/or pairing information by the barcode reader 402.

Step 1044 represents transferring the pairing information to the interface system 410. Step 1044 represents an alternative to steps 1041, 1042, and 1043. In certain embodiments wherein the rendering of the pairing information (step 1040) is in a rendering format other than a barcode (for example audio, modulated illumination, or modulated electromagnetic radiation) the interface system 410 itself may obtain the pairing information. For example, if the pairing information is rendered by the host computer 28 as near field communication (i.e. modulation of electromagnetic radiation) the accessory may contain a compatible near field communication system and obtain the connection and/or pairing information using near field communication.

Step 1045 represents the interface system 410 determining the second confirmation value (Vb) from the pairing information. The interface system 410 may then determine 1046 whether the first confirmation value (Va) equals the second confirmation value (Vb). If the first confirmation value (Va) equals the second confirmation value (Vb), the interface system 410 may proceed with the pairing procedure. However, if the first confirmation value (Va) does not equal the second confirmation value (Vb), the interface system 410 may abort 1048 the pairing procedure. If pairing is proceeding, then the remaining phases of SSP (authentication stage two, link key calculation, and LMP authentication and encryption) may be performed as described in the Bluetooth® v2.1 (or later) specification to complete pairing and establish the wireless communication link 40.

At step 1050 the interface system 410 may provide a confirmation that the pairing is complete (i.e., that the wireless communication link 40 has been established) to the barcode reader 402 and the barcode reader 402 may signal that the wireless communication link 40 has been established (and the barcode reader 402 is ready for operation with the host computer 28) at step 1052*a*.

Alternatively, the interface system 410 itself may signal that the wireless communication link 40 has been established (and the barcode reader 402 is ready for operation with the host computer 28) at step 1052*b*. In either case, signaling may include illumination/modulation of an indicator light or activation of a vibration motor in a predetermined modulation pattern.

Following confirmation of the communication link the interface system 410 and the host computer may complete the authentication process, if required, as described in FIG. 3 and represented by step 802.

FIG. 11 illustrates another method 1100 for pairing an electronic device, such as an interface system 410, to a host computer 28. In this method 1100, pairing between the interface system 410 and the host computer 28 is being performed in accordance with Bluetooth® v2.1 (or later), and the passkey entry association model is being used.

During public key exchange 1106, the interface system 410 may generate 1109 an ECDH public-private key pair (PKa and SKa, respectively). The host computer 28 may also generate 1110 an ECDH public-private key pair (PKb and SKb, respectively). The interface system 410 may send 1112 its public key (PKa) to the host computer 28. The host computer 28 may send 1114 its public key (PKb) to the interface system 410.

During authentication stage one 1108, the host computer 28 may determine 1116 a k-bit passkey (rb). The host computer 28 may generate 1118 and render 1120 the pairing information including the passkey (rb). The pairing information may be rendered in any of the ways the connection and/or pairing information could be rendered as described with respect to step 902 (FIG. 9).

Step 1121 represents the barcode reader 402 obtaining the pairing information for example by reading a barcode displayed on, or associated with, the host computer 28. In other embodiments the barcode reader may obtain the pairing information by other means compatibly with the technology used for rendering the pairing information (step 1120).

Step 1122 represents the barcode reader 402 recognizing that it has obtained pairing information. As discussed, in embodiments where the pairing information is rendered as a barcode, it is useful for the barcode reader 402 to be able to distinguish between a barcode that contains pairing information and a barcode that includes data which is to be read and processed in the ordinary course of use of the barcode reader 402.

In one embodiment, recognition may be based on a signal from the interface system 410. For example, if the interface system 410 is not connected or paired with a host computer 28 it may provide a signal to the barcode reader 402 indicating that it is not connected or paired and a data from a subsequent barcode read may therefore be recognized as pairing information at step 1122. To further facilitate, upon receipt of the signal from the interface system 410 the barcode reader may go into a "connection mode" wherein a signal is provided to the operator (i.e., modulation of an indicator light on the housing or a vibration indicator) indicating to the operator that the operator is to use the barcode reader 402 to read connection and/or pairing information.

In another embodiment, recognition may be based on the format of the barcode and/or control information within the barcode. For example the connection and/or pairing information may be in a barcode format that is used exclusively for connection and/or pairing information. In another example, the connection and/or pairing information may be preceded by a character string or other indicator that is an exclusive indicator for connection and/or pairing information (or identifies the type of connection and/or pairing to be performed) and is therefore recognized as connection and/or pairing information by the barcode reader 402.

Step 1123 represents transferring the pairing information to the interface system 410. Step 1124 represents an alternative to steps 1121, 1122, and 1123. In certain embodiments wherein the rendering of the pairing information (step 1120) is in a rendering format other than a barcode (for example audio, modulated illumination, or modulated electromagnetic radiation) the interface system 410 itself may obtain the pairing information. For example, if the pairing information is rendered by the host computer 28 as near field communication (i.e. modulation of electromagnetic radiation) the accessory may contain a compatible near field communication system and obtain the connection and/or pairing information using near field communication.

The interface system 410 may determine 1125 the passkey (rb) from the pairing information, and may set 1126 a passkey variable (ra) equal to the passkey (rb) received from the host computer 28.

The interface system 410 and the host computer 28 may then perform a multi-stage process 1128. Via the multi-stage process 1128, the interface system 410 may calculate a first commitment value (Ca), and the host computer 28 may calculate a second commitment value (Cb). The interface system 410 may send the first commitment value (Ca) to the host computer 28 one segment (e.g., one bit) at a time. Conversely, the host computer 28 may send the second commitment value (Cb) to the interface system 410 one segment at a time. Both the interface system 410 and the host computer 28 may compare the first commitment value (Ca) with the second commitment value (Cb) one segment at a time. If the host computer 28 displays the audiovisual data that communicates the passkey (rb), the host computer 28 may discontinue displaying the audiovisual data when comparison of the first commitment value (Ca) with the second commitment value (Cb) begins. The interface system 410 and/or the host computer 28 may abort the pairing procedure if any segment of the first commitment value (Ca) does not match a corresponding segment of the second commitment value (Cb) received from the host computer 28.

The first commitment value (Ca) calculated by the interface system 410 may depend on the public key (PKa) for the interface system 410, the public key (PKb) for the host computer 28, a random nonce (Na), and the passkey (rb). Although FIG. 11 shows the first commitment value (Ca) being calculated using the passkey variable (ra), the passkey variable (ra) may be set equal to the passkey (rb), as indicated previously. Therefore, the first commitment value (Ca) may also depend on the passkey (rb). The second commitment value (Cb) calculated by the host computer 28 may depend on the public key (PKa) for the interface system 410, the public key (PKb) for the host computer 28, a random nonce (Nb), and the passkey (rb).

The multi-stage process 1128 is illustrated in FIG. 11 as a series of operations that are executed k times. FIG. 11 illustrates these operations in relation to the $i^{th}$ stage of the multi-stage process 1128, where i=1, 2, . . . k, and where the passkey (rb) includes k bits.

During the $i^{th}$ stage of the multi-stage process 1128, the interface system 410 may select 1130 a first random nonce (Nai), and the host computer 28 may select 1132 a second random nonce (Nbi). The interface system 410 may calculate 1134 bit i of the first commitment value (Ca). The host computer 28 may calculate 1136 bit i of the second commitment value (Cb). The interface system 410 may send 1138 bit i of the first commitment value (Cai) to the host computer 28.

If the host computer 28 displays the pairing information that communicates the passkey (rb), then in response to receiving the first bit of the first commitment value (Ca) during the first stage of the multi-stage process 1128 (i.e., for i=1), the host computer 28 may erase 1140 the pairing information from the display. The host computer 28 may send 1142 bit i of the second commitment value (Cbi) to the interface system 410. The interface system 410 may send 1144 bit i of the first random nonce (Nai) to the host computer 28. The host computer 28 may check 1146 whether bit i of the first commitment value (Cai) received from the interface system 410 equals bit i of the second commitment value (Cbi), which it previously calculated 1136. If it does, then the pairing procedure may proceed. If not, the host computer 28 may abort the pairing procedure.

The host computer 28 may send 1148 bit i of the second random nonce (Nbi) to the interface system 410. The interface system 410 may check 1150 whether bit i of the second commitment value (Cbi) received from the host computer 28 equals bit i of the first commitment value (Cai), which it previously calculated 1134. If the two bits match, then the multi-stage process 1128 may proceed. If not, the interface system 410 may abort the pairing procedure 1151. If pairing has not been aborted after the multi-stage process 1128 has concluded, then the remaining phases of SSP (authentication stage two, link key calculation, and LMP authentication and encryption) may be performed as described in the Bluetooth® v2.1 (or later) specification.

At step 1152 the interface system 410 may provide a confirmation that the pairing is complete (i.e., that the wireless communication link 40 has been established) to the barcode reader 402 and the barcode reader 402 may signal that the wireless communication link 40 has been established (and the barcode reader 402 is ready for operation with the host computer 28) at step 1154a.

Alternatively, the interface system 410 itself may signal that the wireless communication link 40 has been established (and the barcode reader 402 is ready for operation with the host computer 28) at step 1154b. In either case, signaling may include illumination/modulation of an indicator light or activation of a vibration motor in a predetermined modulation pattern.

Following confirmation of the communication link the interface system 410 and the host computer may complete the authentication process, if required, as described in FIG. 3 and represented by step 802.

FIGS. 9, 10, and 11 depict certain embodiments of operation for establishing a wireless communication link 40 between a remote host and the power/data cable accessory 400 or the battery pack accessory 720. Similar and related systems are described in U.S. patent application Ser. No. 13/916,413, titled "Communicating Wireless Pairing Information for Pairing an Electronic Device to a Host System," filed on Jun. 12, 2013, the contents of which are hereby incorporated by reference.

As discussed, when embodied as a presentation barcode reader 11 (in FIG. 1B), the barcode reading components may be active substantially the entire time the barcode reader 11 is coupled to remote power such that reading of a barcode 12 occurs upon the barcode 12 being presented to the barcode reader 11 by being placed within the field of view 17. In such an embodiment, the power received by the power interface 174a by the operating power management circuits 172 is being used, at substantially the same time that it is being drawn from the remote power source, to power the barcode reading components, which may include the image sensor 136, the system package 146, all or part of the illumination system 130—which do not go into a low power or sleep mode due to the barcode reading systems remaining active. Substantially simultaneously power is being drawn to operate the RF components 108 or the barcode reader 11. Stated alternatively, power from the external power source provides power to both the RF components and the barcode reading components (which remain activated regardless of whether there is a barcode within the field of view 17 and independent of any actuation by the user to initiate a barcode read) in real-time; meaning that the power is being drawn from the remote power source for those components as it is being consumed by those components.

Figures 12A, 12B:
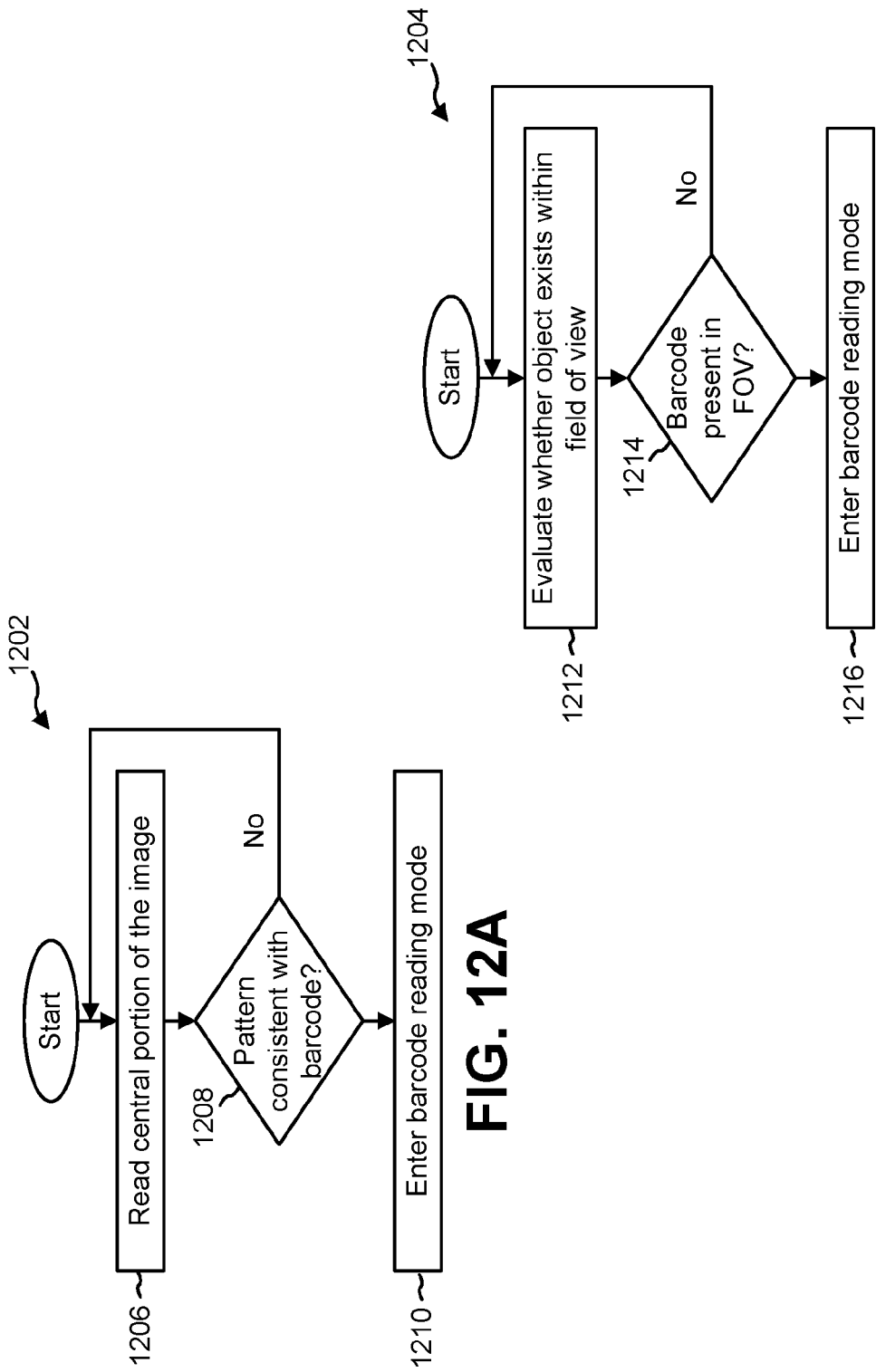
FIGS. 12A and 12B depict exemplary operation of an object detection system embodied in a barcode reader in accordance with one embodiment.

FIG. 12A represents one alternative embodiment 1202 of operation of an object detection system 109 (FIG. 1B). Referring to FIG. 12A in conjunction with FIG. 2, the image sensor 136 may be utilized for object detection but at step 1206 only a central portion of the image sensor may be read out and used to evaluate whether a barcode exists within the field of view 17, or if the entire image is read out, only pixel values from a central portion are used to evaluate whether a barcode exists within the field of view 17. Again, the required image sensor components remain active as described, however upon recognizing at step 1208 that the portion of the image within the central portion of the field of view 17 has a contrast pattern consistent with that of a barcode, the barcode reader 11 may enter a barcode reading mode at step 1210 in which it may capture a full image of the barcode for decoding.

FIG. 12B represents a second alternative embodiment 1204 of operation of an object detection system 109 (in FIG. 1B). Referring to FIG. 12B in conjunction with FIG. 2, a separate barcode detection system (i.e., a proximity sensor, a single separate image sensor) may be utilized for object detection but at step 1212 it may be used to evaluate whether an object exists within the field of view 17. The required components remain active as described and upon recognizing at step 1214 that an object, which may be consistent with that of a barcode, is present within the field of view 17, the barcode reader 11 may enter a barcode reading mode at step 1216 in which it may capture a full image of the barcode for decoding.

One or more of the features, functions, procedures, operations, components, elements, structures, etc. described in connection with any one of the configurations described herein may be combined with one or more of the functions, procedures, operations, components, elements, structures, etc. described in connection with any of the other configurations described herein, where compatible.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A barcode reader system comprising:
   a barcode reader requiring power from a remote power source, the barcode reader being configured to decode a barcode and generate decoded data; and
   an accessory comprising a flexible cable, a first power/data connector, a second power/data connector, and a wireless interface circuit;
   the flexible cable being configured to couple the remote power source to the barcode reader;
   the first power/data connector being configured to connect to the barcode reader, provide operating power to the barcode reader, receive the decoded data from the barcode reader, and provide the decoded data to the wireless interface circuit;
   the second power/data connector being configured to connect to the remote power source and draw operating power from the remote power source for both: i) the wireless interface circuit, and ii) the barcode reader; and
   the wireless interface circuit being configured to wirelessly transmit the decoded data generated by the barcode reader to a remote mobile device, the remote mobile device being distinct from the remote power source.

2. The barcode reader system of claim 1, wherein the second power/data connector is a Universal Serial Bus (USB) male connector.

3. The barcode reader system of claim 1, wherein the flexible cable includes a segment that couples the wireless interface circuit to the first power/data connector.

4. The barcode reader system of claim 1, wherein the flexible cable includes a segment that couples the wireless interface circuit to the second power/data connector.

5. The barcode reader system of claim 1, wherein the flexible cable comprises:
   a first segment that couples the wireless interface circuit to the first power/data connector; and
   a second segment that couples the wireless interface circuit to the second power/data connector.

6. The barcode reader system of claim 1, wherein the accessory further comprises:
   a first power/data interface configured to interface with the barcode reader via the first power/data connector; and
   a second power/data interface configured to interface with and draw power from the remote power source via the second power/data connector.

7. The barcode reader system of claim 6, wherein the accessory further comprises a power interface circuit that is configured to receive power from the second power/data interface, convert a first portion of the received power to applicable power levels for one or more components of the accessory, and provide a second portion of the received power to the first power/data interface.

8. The barcode reader system of claim 1, further comprising a point-to-point communication interface that is configured to establish a point-to-point connection between the accessory and the barcode reader.

9. The barcode reader system of claim 1, wherein the wireless interface circuit is configured to establish a wireless point-to-point communication link with the remote mobile device.

10. The barcode reader system of claim 1, wherein the wireless interface circuit is configured to establish the accessory as an addressable endpoint on a wireless local area network (LAN) and to wirelessly communicate with the remote mobile device through the wireless LAN.

11. A barcode reading system configured to decode a barcode and provide decoded data to a remote host computer, the barcode reading system comprising:
    a barcode reader requiring power from a remote power source for operation and comprising a decoder that is stored in memory of the barcode reader and executed by a barcode reader processor to generate the decoded data from the barcode; and
    a flexible power/data cable accessory coupled to the barcode reader, the flexible power/data cable accessory comprising:
       a first power/data connector configured to connect the flexible power/data cable accessory to the barcode reader, provide operating power to the barcode reader, and receive decoded data from the barcode reader;
       an accessory circuit configured to establish a wireless communication link with the remote host computer, receive the decoded data from the first power/data connector, and wirelessly provide the decoded data to the remote host computer; and
       a second power/data connector configured to connect to the remote power source and draw operating power from the remote power source for both: i) the accessory circuit, and ii) the barcode reader.

12. The barcode reading system of claim 11, wherein the accessory circuit further comprises memory that comprises at least one of a point-to-point interface driver, a radio frequency (RF) circuit driver, an accessory protocol code, or a relay code.

13. The barcode reading system of claim 11, wherein the flexible power/data cable accessory comprises a flexible cable segment that couples the accessory circuit to the first power/data connector.

14. The barcode reading system of claim 11, wherein the flexible power/data cable accessory comprises a flexible cable segment that couples the accessory circuit to the second power/data connector.

15. The barcode reading system of claim 11, wherein the flexible power/data cable accessory comprises:
    a first flexible cable segment that couples the accessory circuit to the first power/data connector; and
    a second flexible cable segment that couples the accessory circuit to the second power/data connector.

16. The barcode reading system of claim 11, wherein the accessory circuit further comprises:
- a first power/data interface configured to interface with the barcode reader via the first power/data connector; and
- a second power/data interface configured to interface with and draw power from the remote power source via the second power/data connector.

17. The barcode reading system of claim 16, wherein the accessory circuit further comprises a power interface circuit that is configured to receive power from the second power/data interface, convert a first portion of the received power to applicable power levels for one or more components of the accessory circuit, and provide a second portion of the received power to the first power/data interface.

18. The barcode reading system of claim 11, further comprising a point-to-point communication interface that is configured to establish a point-to-point connection between the flexible power/data cable accessory and the barcode reader.

19. The barcode reading system of claim 11, wherein the accessory circuit is configured to establish a wireless point-to-point communication link with the remote host computer.

20. The barcode reading system of claim 11, wherein the accessory circuit is configured to establish the flexible power/data cable accessory as an addressable endpoint on a wireless local area network (LAN) and to wirelessly communicate with the remote mobile device through the wireless LAN.

* * * * *